United States Patent
Hou et al.

(10) Patent No.: US 12,054,682 B2
(45) Date of Patent: Aug. 6, 2024

(54) PROCESS AND SYSTEM FOR PRODUCING LIGHT OLEFINS FROM INFERIOR OILS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Huandi Hou, Beijing (CN); Xiaoli Wei, Beijing (CN); Jun Long, Beijing (CN); Ming Dong, Beijing (CN); Jiushun Zhang, Beijing (CN); Shuandi Hou, Beijing (CN); Xuefeng Chen, Beijing (CN); Jialin Liang, Beijing (CN); Jiguang Li, Beijing (CN); Cuihong Wang, Beijing (CN); Haiping Shen, Beijing (CN); Jianhong Gong, Beijing (CN); Lishun Dai, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 279 days.

(21) Appl. No.: 17/435,569

(22) PCT Filed: Mar. 2, 2020

(86) PCT No.: PCT/CN2020/077389
§ 371 (c)(1),
(2) Date: Sep. 1, 2021

(87) PCT Pub. No.: WO2020/177652
PCT Pub. Date: Sep. 10, 2020

(65) Prior Publication Data
US 2022/0064552 A1    Mar. 3, 2022

(30) Foreign Application Priority Data

Mar. 4, 2019  (CN) .......................... 201910159559.1
Mar. 4, 2019  (CN) .......................... 201910159576.5
Mar. 4, 2019  (CN) .......................... 201910159674.9

(51) Int. Cl.
  *C10G 69/04*    (2006.01)
  *B01D 3/10*     (2006.01)
  (Continued)

(52) U.S. Cl.
  CPC .............. *C10G 69/04* (2013.01); *B01D 3/10* (2013.01); *B01D 3/143* (2013.01);
  (Continued)

(58) Field of Classification Search
  CPC ................ C10G 69/04; C10G 2400/20; C10G 2300/1007; C10G 2300/202;
  (Continued)

(56) References Cited

U.S. PATENT DOCUMENTS

2002/0125172 A1*  9/2002  Que ....................... C10G 47/26
                                                        208/108
2003/0127358 A1   7/2003  Letzsch
(Continued)

FOREIGN PATENT DOCUMENTS

CN    1233644 A    11/1999
CN    1171978 C    10/2004
(Continued)

*Primary Examiner* — Prem C Singh
*Assistant Examiner* — Brandi M Doyle
(74) *Attorney, Agent, or Firm* — NKL Law; Allen Xue

(57) ABSTRACT

A process for producing light olefins from inferior oils includes the steps of: subjecting an inferior oil to a thermal
(Continued)

conversion reaction in the presence of hydrogen to obtain a conversion product; separating the conversion product to obtain a first separated product; separating the first separated product to obtain an upgraded oil and a pitch; subjecting the upgraded oil to hydro-upgrading to obtain a hydro-upgraded oil; separating the hydro-upgraded oil to obtain a hydro-upgraded heavy oil; and subjecting the hydro-upgraded heavy oil to catalytic cracking to obtain a catalytic cracking product comprising a light olefin.

20 Claims, 4 Drawing Sheets

(51) Int. Cl.
  *B01D 3/14* (2006.01)
  *B01D 11/04* (2006.01)
  *B01J 19/24* (2006.01)

(52) U.S. Cl.
  CPC ......... *B01D 11/0492* (2013.01); *B01J 19/245* (2013.01); *B01J 19/246* (2013.01); *B01J 2219/0004* (2013.01); *C10G 2300/1007* (2013.01); *C10G 2300/202* (2013.01); *C10G 2300/205* (2013.01); *C10G 2300/206* (2013.01); *C10G 2300/301* (2013.01); *C10G 2300/308* (2013.01); *C10G 2300/4006* (2013.01); *C10G 2300/4012* (2013.01); *C10G 2300/4018* (2013.01); *C10G 2300/70* (2013.01); *C10G 2400/20* (2013.01)

(58) Field of Classification Search
  CPC ........ C10G 2300/205; C10G 2300/206; C10G 2300/301; C10G 2300/308; C10G 2300/4006; C10G 2300/4012; C10G 2300/4018; C10G 2300/70; B01J 19/245; B01J 19/246; B01J 2219/0004; B01D 3/10; B01D 3/143; B01D 11/0492
  See application file for complete search history.

(56) References Cited

U.S. PATENT DOCUMENTS

| | | | |
|---|---|---|---|
| 2012/0061293 | A1 | 3/2012 | Sanchez et al. |
| 2013/0006028 | A1* | 1/2013 | Xie ............ C10G 51/026 422/142 |
| 2013/0112593 | A1 | 5/2013 | Montanari et al. |
| 2017/0145320 | A1* | 5/2017 | Li ..................... C10G 47/02 |

FOREIGN PATENT DOCUMENTS

| | | |
|---|---|---|
| CN | 101045884 A | 10/2007 |
| CN | 101987972 A | 3/2011 |
| CN | 102021031 A | 4/2011 |
| CN | 102618323 A | 8/2012 |
| CN | 103789036 B | 9/2015 |
| CN | 106635138 A | 5/2017 |
| CN | 104995284 B | 2/2018 |
| CN | 106701185 B | 3/2018 |
| CN | 109385306 A | 2/2019 |
| CN | 109486519 A | 3/2019 |
| JP | H04501879 A | 4/1992 |
| JP | 2014512428 A | 5/2014 |
| RU | 2567232 C2 | 11/2015 |
| RU | 2662437 C2 | 7/2018 |
| WO | 2014096591 A1 | 6/2014 |
| WO | 2015084779 A1 | 6/2015 |
| WO | 2019046989 A1 | 3/2019 |

* cited by examiner

PROCESS AND SYSTEM FOR PRODUCING LIGHT OLEFINS FROM INFERIOR OILS

CROSS REFERENCE TO RELATED APPLICATIONS

The present application is a U.S. national stage entry of International Application No. PCT/CN2020/077389, filed Mar. 2, 2020, which claims priority of Chinese patent application No. 201910159559.1, titled "process and system for producing light olefins from inferior oils", filed on Mar. 4, 2019, Chinese patent application No. 201910159576.5, titled "upgrading process and system for producing light olefins from inferior oils", filed on Mar. 4, 2019, and Chinese patent application No. 201910159674.9, titled "process and system for producing propylene and high octane gasoline from inferior oils", filed on Mar. 4, 2019, which is incorporated herein by reference in its entirety.

TECHNICAL FIELD

The present application relates to catalytic conversion of hydrocarbon oils, particularly to a process and system for producing light olefins by carrying out catalytic cracking on inferior oils after catalytic upgrading in the presence of hydrogen.

BACKGROUND ART

Light olefins represented by ethylene and propylene are the most basic raw materials used in chemical industry. Currently, about 98% of the ethylene produced around the world comes from steam cracking technology, with naphtha accounting for 46% and ethane accounting for 34% of the feedstocks used for ethylene production. About 62% of the propylene comes from the co-production with ethylene by steam cracking. The steam cracking technology has become substantially perfect, is a process of consuming a large amount of energy, and is limited by using high-temperature resistant materials, and thus has little potential for further improvement.

With the slow recovery of the world economy, the increase of oil demand is slowed down, and the supply and demand of the world oil market are basically kept loose. The international energy agency believes that, on the supply side, the crude oil production will continue to rise in Non-OPEC countries including the United States in the coming years, and the global crude oil demand will be tightened in 2022; on the demand side, the global crude oil demand will continuously rise in the next 5 years, and the demand may be over 1 hundred million barrels per day in 2019; among them, the amount of unconventional oils and inferior heavy oils to be processed is increasing year by year. Therefore, the process for producing chemical raw materials such as light olefins to the maximum extent from unconventional oils or inferior oils is the key point for broadening the source of the raw materials for producing light olefins, adjusting the product structure, and improving the quality of products and enhancing the efficiency in petrochemical enterprises.

Chinese patent application publication CN101045884A discloses a process for producing clean diesel and light olefins from residual oil and heavy distillate oil. In the process, residual oil and an optional catalytic cracking slurry oil are fed to a solvent deasphalting unit, the obtained deasphalted oil and an optional heavy distillate oil are fed to a hydrogenation unit and subjected to hydrocracking reaction in the presence of hydrogen, and the products are separated to obtain light and heavy naphtha fractions, diesel oil fraction and hydrogenated tail oil; the hydrogenated tail oil is fed to a catalytic cracking unit to carry out catalytic cracking reaction, and the product is separated to obtain light olefins, gasoline fraction, diesel oil fraction and slurry oil; the diesel oil is recycled to the catalytic cracking unit, and all or part of the slurry oil is returned to the solvent deasphalting unit. The process is used to process a mixture of vacuum residue and catalytic cracking slurry oil to yield 27.3 wt % propylene and 10.6 wt % ethylene.

International application publication WO2015084779A1 discloses a process for producing light olefins, particularly propylene, using a combination of solvent deasphalting and high severity catalytic cracking. The process comprises the following steps: mixing a vacuum residue and a solvent, and then performing a solvent deasphalting treatment to obtain deasphalted oil rich in the solvent and deoiled asphalt; the deasphalted oil rich in solvent is fed to a heavy oil deep catalytic cracking device for deep cracking reaction after separating the solvent, to obtain a target product rich in light olefins, especially propylene. In the process, the residual oil is first subjected to solvent deasphalting treatment, and then the deasphalted oil is efficiently converted to produce light olefins through a combined process, but the deoiled asphalt is not used or processed.

Chinese patent publication CN106701185B discloses a residual oil treatment process, comprising a solvent deasphalting device, a hydrogenation pretreatment reaction zone, a hydrotreating reaction zone and a catalytic cracking reaction zone; the process comprises the following steps: separating a residual oil feedstock by fractionation to obtain a light fraction and a heavy fraction, treating the heavy fraction in a solvent deasphalting device to obtain deasphalted oil and deoiled asphalt, mixing the light fraction, the deasphalted oil and hydrogen, passing the resulted mixture sequentially through a hydrogenation pretreatment reaction zone and a hydrotreating reaction zone connected in series, subjecting the reaction effluent from the hydrotreating reaction zone to gas-liquid separation, recycling the resulting gas phase to the hydrogenation pretreatment reaction zone and/or the hydrotreating reaction zone, feeding the resulting liquid phase directly into a catalytic cracking reaction zone to carry out catalytic cracking reaction, and separating the catalytic cracking reaction effluent to obtain dry gas, liquefied gas, a catalytic cracking gasoline fraction, a catalytic cracking diesel fraction, a catalytic cracking heavy cycle oil and a catalytic cracking slurry oil. The process of the patent can prolong the stable operation period of the device.

Chinese patent publication CN1171978C discloses a process for the conversion of high-sulfur high-metal residual oils, in which deasphalted oil obtained by extracting residual oil and slurry oil with a solvent, a heavy cycle oil and an optional solvent refining extract oil are fed into a hydrotreatment device together, and reacted in the presence of hydrogen and a hydrogenation catalyst, and the product is separated to obtain gas, naphtha, hydrogenated diesel oil and hydrogenated tail oil, in which the hydrogenated tail oil is fed into a catalytic cracking device, and subjected to cracking reaction in the presence of cracking catalyst, and the reaction product is separated, in which the resulting heavy cycle oil can be recycled to the hydrotreatment device, and the resulting slurry oil is recycled to the solvent deasphalting device. The process can reduce the investment and operation cost of the hydrotreatment device, and improve the yield and quality of the light oil.

In order to obtain more light olefins from inferior oils, the prior art adopts a technology combining solvent deasphalting and hydrotreatment to provide a high-quality feedstock for catalytic cracking, but the yield of deasphalted oil is low, and the benefit is limited from the viewpoint of economy of the whole process, and in addition, the deoiled asphalt is not well utilized. Consequently, the utilization rate of the inferior oil in the prior art is low, and more pitches are still generated. Thus, there is a need to develop a green and efficient conversion technology for producing light olefins from inferior oils, so as to increase the utilization rate of the inferior oil and to produce more ethylene, propylene and the like with high added values.

SUMMARY OF THE INVENTION

An object of the present application is to provide a process and system for producing light olefins from inferior oils. The process and system can realize green and efficient conversion of inferior oils and can also realize the production of chemical raw materials, namely light olefins, from inferior oils.

In order to achieve the above object, in an aspect, the present application provides a process for producing light olefins from inferior oils, comprising the steps of:
1) subjecting an inferior oil feedstock to a thermal conversion reaction in the presence of hydrogen to obtain a conversion product;
2) subjecting the conversion product to a first separation to obtain a first separated product, wherein in the first separated product, the content of components having a boiling point below 350° C. is not greater than about 5 wt %, and the content of components having a boiling point between 350° C. and 524° C. is about 20-60 wt %;
3) subjecting the first separated product to a second separation selected from vacuum distillation, solvent extraction or a combination thereof to obtain an upgraded oil and a pitch;
4) subjecting the upgraded oil obtained in step 3) to hydro-upgrading to obtain a hydro-upgraded oil;
5) subjecting the hydro-upgraded oil obtained in step 4) to a third separation to obtain a hydro-upgraded heavy oil;
6) subjecting the hydro-upgraded heavy oil obtained in step 5) to catalytic cracking to obtain a catalytic cracking product comprising a light olefin; and
7) optionally, recycling at least a part of the pitch obtained in step 3) to step 1) for the thermal conversion reaction.

In another aspect, the present application also provides a system for producing light olefins from inferior oils, comprising a thermal conversion reaction unit, a first separation unit, a second separation unit, a hydro-upgrading unit, a third separation unit and a catalytic cracking unit, wherein:
the thermal conversion reaction unit is configured to carry out a thermal conversion reaction on an inferior oil feedstock in the presence of hydrogen to obtain a conversion product,
the first separation unit is configured to separate the conversion product to obtain a first separated product, wherein in the first separated product, the content of components having a boiling point below 350° C. is not greater than about 5 wt %, and the content of components having a boiling point between 350° C. and 524° C. is about 20-60 wt %;
the second separation unit is configured to separate the first separated product into an upgraded oil and a pitch, and is selected from a vacuum distillation unit, a solvent extraction unit or a combination thereof;

the hydro-upgrading unit is configured to carry out hydro-upgrading reaction on the upgraded oil to obtain a hydro-upgraded oil;
the third separation unit is configured to separate the hydro-upgraded oil to obtain a hydro-upgraded heavy oil; and
the catalytic cracking unit is configured to carry out catalytic cracking reaction on the hydro-upgraded heavy oil to obtain a catalytic cracking product comprising a light olefin.

The process and system of the present application provide one or more of the following advantages over the prior art:
1. The processing of inferior oils with high metal and high asphaltene content, a high-efficiency conversion of inferior oil feedstocks, and a great reduction of the pitch amount can be achieved. Preferably, the overall conversion of the inferior oil feedstock can be greater than 90 wt %, or even greater than 95 wt %, and the amount of discarded pitch can be less than 10 wt %, or even less than 5 wt %.
2. The process and system of the present application optimize the distillation range and composition of the material to be subjected to the second separation, and allow an easy operation of the second separation process.
3. The present application allows a high efficiency upgrading of inferior oil feedstocks and provides an upgrading oil rich in saturated structure and substantially free of heavy metal and asphaltene for catalytic cracking units. Preferably, the resulting upgraded oil may have a heavy metal content (calculated as the total weight of nickel and vanadium) of less than 10 µg/g, or even less than 5 µg/g, and the upgraded oil may have an asphaltene content of less than 2.0 wt %, or even less than 0.5 wt %.
4. The present application allows further processing of the upgraded oil to produce chemical raw materials, namely light olefins, and the yield of light olefins can be more than 36%.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

Figure 1A:
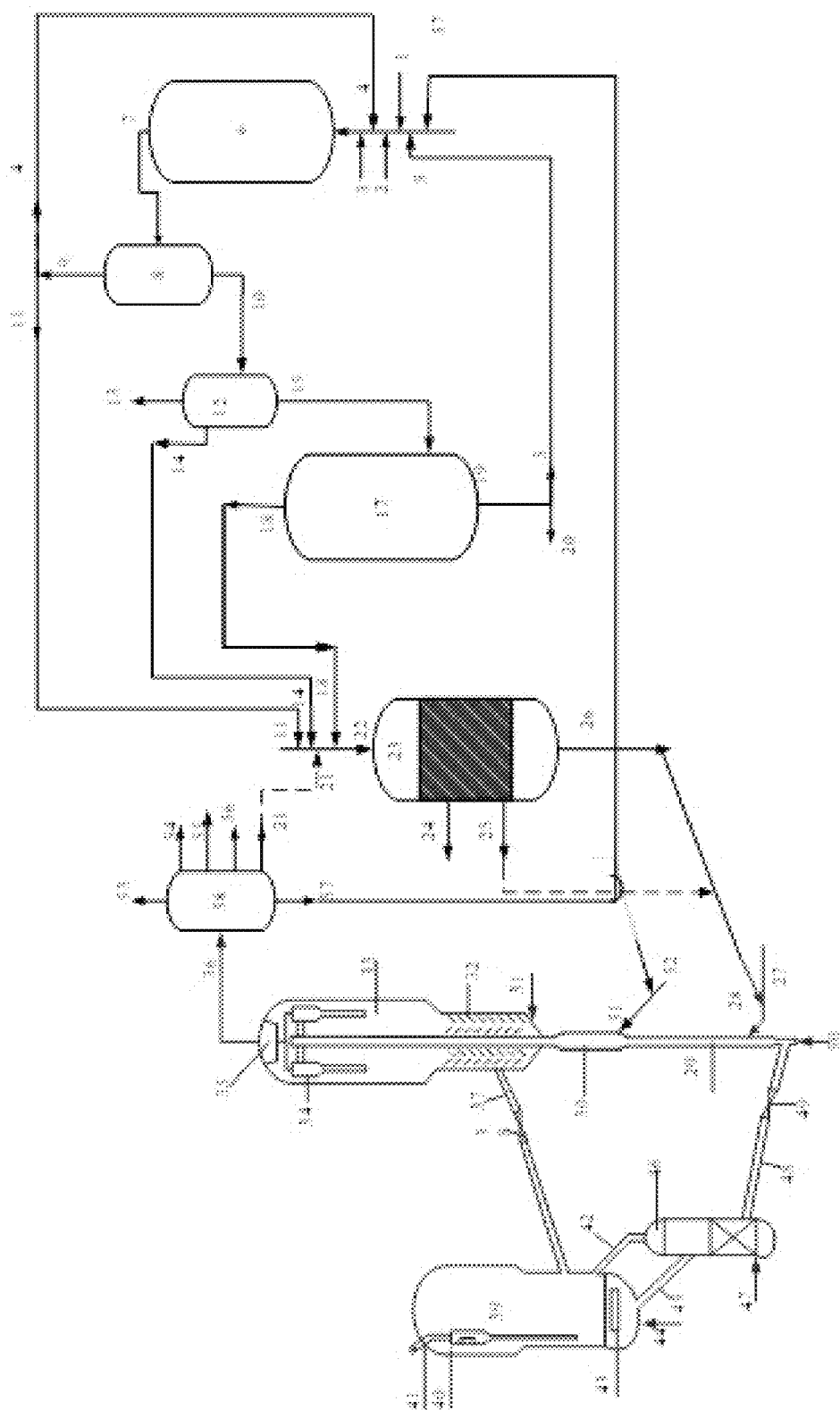
FIG. 1a shows a schematic diagram of a preferred embodiment of the process and system of the present application.

| Description of the reference numerals | | |
|---|---|---|
| 1 pipeline | 2 pipeline | 3 pipeline |
| 4 pipeline | 5 pipeline | 6 thermal conversion reactor |
| 7 pipeline | 8 high pressure separation unit | 9 pipeline |
| 10 pipeline | 11 pipeline | 12 low pressure separation unit |
| 13 pipeline | 14 pipeline | 15 pipeline |
| 16 pipeline | 17 second separation unit | 18 pipeline |
| 19 pipeline | 20 pipeline | 21 pipeline |
| 22 pipeline | 23 hydro-upgrading unit | 24 pipeline |
| 25 pipeline | 26 pipeline | 27 pipeline |
| 28 pipeline | 29 first reaction zone | 30 second reaction zone |
| 31 pipeline | 32 stripping section | 33 disengager |
| 34 cyclone separator | 35 gas collection chamber | 36 vapor line |
| 37 spent catalyst standpipe | 38 spent catalyst slide valve | 39 regenerator |
| 40 cyclone separator | 41 flue gas pipeline | 42 pipeline |
| 43 air distributor | 44 pipeline | 45 pipeline |
| 46 degassing tank | 47 pipeline | 48 regenerated catalyst standpipe |
| 49 regenerated catalyst slide valve | 50 pipeline | 51 pipeline |
| 52 pipeline | 53 pipeline | 54 pipeline |
| 55 pipeline | 56 pipeline | 57 pipeline |
| 58 separator | | |

DETAILED DESCRIPTION OF THE INVENTION

The present application will be further described hereinafter in detail with reference to particular embodiments thereof and the accompanying drawings. It should be noted that the particular embodiments of the present application are provided for illustration purpose only, and are not intended to be limiting in any manner.

In the context of the present application, the boiling point, boiling range (sometimes also referred to as distillation range), end boiling point and initial boiling point or similar parameters disclosed herein are all measured at atmospheric pressure (101325 Pa).

In the context of the present application, unless otherwise specified, the pressures given are all gauge pressures.

All publications, patent applications, patents, and other references cited herein are hereby incorporated by reference in their entirety.

Unless otherwise stated, the terms used herein have the same meaning as commonly understood by the person skilled in the art; and if the terms are defined herein and their definitions are different from the ordinary understanding in the art, the definition provided herein shall prevail.

Where a material, substance, process, step, device, component or the like is modified using "commonly used in the art", "commonly known in the art", or similar expressions, the subject matter modified by such an expression is intended to encompass not only those commonly used or known in the art at the time of the filing of the present application, but also those not commonly used or known at present but will become well known in the art to be useful for a similar purpose.

Unless otherwise specified, all percentages, parts, ratios, etc. disclosed herein are expressed on a weight basis, unless such an interpretation is in conflict with the general understanding of those of skill in the art.

Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

In a first aspect, the present application provides a process for producing light olefins from inferior oils, comprising the steps of:
1) subjecting an inferior oil feedstock to a conversion reaction in the presence of hydrogen to obtain a conversion product;
2) subjecting the conversion product to a first separation to obtain a first separated product, wherein in the first separated product, the content of components having a boiling point below 350° C. is not greater than about 5 wt %, and the content of components having a boiling point between 350° C. and 524° C. is about 20-60 wt %;
3) subjecting the first separated product to a second separation selected from vacuum distillation, solvent extraction or a combination thereof to obtain an upgraded oil and a pitch;
4) subjecting the upgraded oil obtained in step 3) to hydro-upgrading to obtain a hydro-upgraded oil;
5) subjecting the hydro-upgraded oil obtained in step 4) to a third separation to obtain a hydro-upgraded heavy oil;
6) subjecting the hydro-upgraded heavy oil obtained in step 5) to catalytic cracking reaction to obtain a catalytic cracking product comprising a light olefin; and
7) optionally, recycling at least a part of the pitch obtained in step 3) to step 1) for conversion reaction.

The process of the present application can maintain the long-term operation of the system while reducing discarded pitch as much as possible and improving the utilization rate of resources, in which the conversion reaction and each separation step are the key point that determines whether the system can be operated for a long time or not, and the conversion rate of the conversion reaction is very important for the stability control of the system and the stability of the separation operation. The inventors have found after extensive experiments that in the conversion reaction the conversion rate of components having a boiling point above 524° C. in the inferior oil (also referred to herein as "conversion rate of the conversion reaction") may be in a range of about 30-70 wt %, preferably about 30-60 wt %, wherein the conversion rate=(weight of components having a boiling point above 524° C. in the inferior oil−weight of components having a boiling point above 524° C. in the conversion product)/weight of components having a boiling point above 524° C. in the inferior oil×100 wt %.

According to the present application, said conversion reaction of step 1) is essentially a thermal conversion reaction, in which macromolecules of the inferior oil, especially asphaltene aggregates, are subjected to disaggregation of asphaltene aggregates, cracking of macromolecules and removal of heteroatoms S, N, and said thermal conversion reaction brings about a conversion rate of components having a boiling point above 524° C. in the inferior oil in a range of about 30-70 wt %, preferably about 30-60 wt %. There is no strict requirement on the conditions (including the catalyst) and reactor used in the present application for conversion reaction, as long as the above conversion rate can be achieved.

According to the present application, the conversion reaction may be carried out in the presence or absence of a conversion catalyst. In a preferred embodiment, the conversion reaction is carried out in the presence of a conversion catalyst, which may comprise at least one selected from the group consisting of Group VB metal compounds, Group VIB metal compounds, and Group VIII metal compounds, preferably at least one of Mo compounds, W compounds. Ni compounds. Co compounds. Fe compounds, V compounds, and Cr compounds. Further preferably, the conversion catalyst is not a supported catalyst, and may be for example a dispersed catalyst. For example, the conversion catalyst may be selected from the group consisting of a solid material comprising a sulfide of the above-mentioned metal, an organic complex or chelate comprising the above-mentioned metal, or an aqueous solution comprising an oxide of the above-mentioned metal. In particular, the conversion catalyst may be, for example, an organo-metal complex/chelate such as one or more of molybdenum octoate, molybdenum naphthenate, nickel naphthenate, tungsten naphthenate, iron oleate, molybdenum dialkylthioformate, etc.; or solid powder comprising an oxide and/or sulfide of the above-mentioned metal, such as one or more of hematite, molybdenite, molybdenum sulfide, iron sulfide, etc.; or an aqueous solution containing an oxide of the above-mentioned metal and/or an inorganic acid salt capable of decomposing to produce an oxide of the above-mentioned metal, for example, an aqueous solution of ammonium molybdate, molybdenum sulfate, molybdenum nitrate, nickel nitrate, cobalt nitrate, molybdenum oxide, iron oxide, nickel oxide, tungsten oxide, vanadium oxide, etc. The conversion catalyst is present in the reaction system in a highly dispersed form with a particle size of from about 2 nm to about 50 μm, preferably from about 2 nm to about 1 μm.

In a preferred embodiment, said conversion reaction of step 1) is carried out in a slurry bed reactor, in which the liquid reactant is reacted in the presence of a catalyst that is present in the form of a solid suspension.

In a preferred embodiment, the conversion reaction may be carried out under conditions including: a temperature of about 380-470° C. preferably about 400-440° C.; a hydrogen partial pressure of about 10-25 MPa, preferably about 13-20 MPa, a volume space velocity of the inferior oil of about 0.01-2 h$^{-1}$, and preferably about 0.1-1.0 h$^{-1}$; a volume ratio of hydrogen to the inferior oil of about 500-5000, preferably about 800-2000, and an amount of the conversion catalyst of about 10-50000 μg/g, preferably about 30-25000 μg/g calculated on the basis of the active metal in the conversion catalyst and relative to the weight of the inferior oil.

According to the present application, the inferior oil may be selected from low quality feedstock oil containing asphaltenes, where said asphaltenes refer to materials in the feedstock oil that are not soluble in non-polar, small molecular n-alkanes (such as n-pentane or n-heptane) but soluble in benzene or toluene. Preferably, the inferior oil meets one or more of the following criteria: an API value of less than about 27, a boiling point greater than about 350° C. (preferably greater than about 500° C., more preferably greater than about 524° C.), an asphaltene content greater than about 2 wt % (preferably greater than about 5 wt %, more preferably greater than about 10 wt %, still more preferably greater than about 15 wt %), and a heavy metal content greater than about 100 μg/g, calculated as the total weight of nickel and vanadium. In certain embodiments, the inferior oil may be at least one selected from the group consisting of inferior crude oil, heavy oil, deoiled asphalt, coal derived oil, shale oil, and petrochemical waste oil. Other low-quality feedstock oil well known to those skilled in the art can be used alone or in mixture as the inferior oil feedstock for conversion reaction, of which the detailed description is omitted herein for brevity.

According to the present application, the "inferior crude oil" can be "thick oil", where the "thick oil" refers to crude oil with high content of asphaltene and resin and high viscosity, and a crude oil with a density of more than 0.943 g/cm$^3$ at 20° C. on the ground and a crude oil viscosity of more than 50 centipoises underground is normally referred to as a thick oil.

According to the present application, the "heavy oil" refers to distillate oil or residual oil having a boiling point above 350° C., where the "distillate oil" generally refers to distillate products obtained by atmospheric distillation and vacuum distillation of crude oil or secondary processing oil, such as heavy diesel oil, heavy gas oil, lubricating oil fraction or cracking feedstock and the like; the "residual oil" refers to bottoms obtained by atmospheric and vacuum distillation of crude oils, and normally bottoms obtained by atmospheric distillation are referred to as atmospheric residue (typically a fraction having a boiling point above 350° C.) and bottoms obtained by vacuum distillation are referred to as vacuum residue (typically a fraction having a boiling point above 500° C. or 524° C.). The residual oil may be at least one selected from the group consisting of topped crude oil, heavy oil obtained from oil sand bitumen, and heavy oil having an initial boiling point of more than 350° C., wherein the "topped crude oil" refers to an oil withdrawn from the bottom of a primary distillation column or the bottom of a flash column during the fractionation of crude oil in an atmospheric and vacuum distillation process.

According to the present application, the "deoiled asphalt" refers to the raffinate rich in asphaltenes and aromatic components obtained at the bottom of an extraction column, after contacting a feedstock oil with a solvent, dissolving and then separating in a solvent deasphalting device, and can be classified into propane deoiled asphalt, butane deoiled asphalt, pentane deoiled asphalt and the like according to the type of the solvent.

According to the present application, the "coal derived oil" refers to a liquid fuel obtained by subjecting coal to chemical processing as a raw material, and can be at least one selected from coal liquefied oil obtained by coal liquefaction and coal tar obtained by coal pyrolysis.

According to the present application, the "shale oil" refers to synthetic crude oil obtained from oil shale by low-temperature dry distillation or other thermal treatment, which may be a brown sticky paste and may have pungent odor and high nitrogen content.

According to the present application, the "petrochemical waste oil" may be at least one selected from the group consisting of petrochemical waste oil sludge, petrochemical oil residues, and refined products thereof.

According to the present application, the conversion product is subjected to a first separation in step 2) to obtain a first separated product, wherein the content of components having a boiling point below 350° C. in the first separated product is not greater than about 5 wt %, preferably less than about 3 wt %, and the content of components having a boiling point of 350-524° C. (preferably 355-500° C. or 380-524° C. further preferably 400-500° C.) is about 20-60 wt %, preferably about 25-55 wt %. Preferably, the first separated product has an initial boiling point of no less than about 300° C., preferably no less than about 330° C., and more preferably no less than about 350° C.

According to the present application, the first separated product generally consists of components of the conversion product having a relatively higher boiling point, which includes the pitch and the upgraded oil obtained in step 3), wherein the pitch comprises asphaltenes as the main component, and some resin and aromatic components necessary for maintaining fluidity; the upgraded oil can be used as a high-quality raw material in subsequent process to produce other oil products. The remaining components of the conversion product having a relatively lower boiling point may be separated from the first separated product in step 2), such as gaseous products under standard condition (e.g. dry gas and liquefied gas etc.) and other components having a boiling point below 350° C.

According to the present application, the first separation of step 2) is performed to obtain a first separated product that meets the above-mentioned distillation range configuration, and the present application has no specific requirement on the mode for carrying out said separation. In certain embodiments, the first separation is a physical separation, such as extraction, distillation, evaporation, flash evaporation, condensation, or the like.

In a preferred embodiment, said first separation of step 2) comprises:
  2a) separating the conversion product obtained in step 1) at a first pressure and a first temperature to obtain a gas component and a liquid component; and
  2b) separating the resulting liquid component at a second pressure and a second temperature to yield the first separated product and a second separated product, wherein the first pressure is greater than the second pressure.

According to the present application, it is preferable in step 2a) to separate out gaseous products such as hydrogen, and the resulting gas component are enriched in hydrogen, preferably with a hydrogen content of more than 85 wt %. Preferably, said first pressure in step 2a), which for convenience of measurement generally refers to the outlet pressure of the gas component exiting the separation device, may be in a range of about 10-25 MPa, preferably about 13-20 MPa; the first temperature, which for convenience of measurement generally refers to the outlet temperature of the liquid component exiting the separation device, may be about 380-470° C., preferably about 400-440° C. The separation mode of step 2a) may be selected from distillation, fractionation, flash distillation and the like, preferably distillation. The distillation may be carried out in a distillation column, wherein the gas component may be obtained from the top of the distillation column and the liquid component may be obtained from the bottom of the distillation column.

According to the present application, it is preferable in step 2b) to separate out components having a boiling point below 350° C. while retaining as much as possible components having a boiling point of 350-524° C. Preferably, said second pressure of step 2b) is lower than said first pressure, preferably 4-24 MPa, more preferably 7-19 MPa lower than said first pressure, in particular, the second pressure, which for convenience of measurement generally refers to the outlet pressure of the second separated product exiting the separation device, may be in a range of about 0.1-5 MPa, preferably 0.1-4 MPa; the second temperature, which for convenience of measurement generally refers to the outlet temperature of the first separated product exiting the separation device, can be about 150-390° C. preferably 200-370° C. The separation mode of step 2b) may be distillation and/or fractionation, preferably atmospheric or pressurized fractionation, and may be carried out in an atmospheric distillation tank or a pressurized distillation column. According to the present application, the second separated product obtained in step 2b) may comprise light components separated out at the second pressure and second temperature that have a lower boiling point than the first separated product.

In a further preferred embodiment, the first separation of step 2) may further comprise:
  2c) splitting at least a part of the second separated product obtained in step 2b) to obtain a naphtha and an atmospheric gas oil;
  2d) recycling at least a part of the gas component obtained in step 2a) to step 1) for conversion reaction; and/or
  2e) recycling at least a part of the gas component obtained in step 2a) to step 4) for the hydro-upgrading.

According to the present application, the splitting in step 2c) may be carried out by fractionation or distillation, preferably by fractionation, for example in a fractionation column, which may be operated at a pressure of 0.05-2.0 MPa, preferably about 0.1-1.0 MPa, and a temperature of 50-350° C., preferably 150-330° C.

According to the present application, in step 2d) and step 2e), at least a part of the gas component obtained in step 2a) are recycled to step 1) and/or step 4), which can be used directly or used after separation as recycled hydrogen.

In a still further preferred embodiment, the first separation of step 2) may further comprise:
  2f) recycling at least a part of the second separated product obtained in step 2b) and/or at least a part of the atmospheric gas oil obtained in step 2c) to step 4) for hydro-upgrading together with the upgraded oil.

According to the present application, said second separation of step 3) is used to separate the upgraded oil, which is easy to process, from the pitch in the first separated product, which is discarded or recycled to step 1) in step 7) for conversion reaction. In some particular embodiments, the second separation of step 3) may be performed at a third temperature and a third pressure using one or more of vacuum distillation and solvent extraction. Specifically, the vacuum distillation may be carried out in a distillation column with or without packing materials, wherein the third pressure is a vacuum degree of about 1-20 mmHg and the third temperature is about 250° C. to 350° C. The solvent extraction is preferably a countercurrent extraction of the first separated product with an extraction solvent, which may be carried out in any extraction apparatus, for example, in an extraction column, in which case the third pressure may be about 3 to 12 MPa, preferably about 3.5 to 10 MPa, the third temperature may be about 55 to 300° C., preferably about 70 to 220° C., the extraction solvent may be $C_3$ to $C_7$ hydrocarbons, preferably at least one of $C_3$ to $C_5$ alkanes and $C_3$ to $C_5$ olefins, more preferably at least one of $C_3$ to $C_4$ alkanes and $C_3$ to $C_4$ olefins, and the weight ratio of the extraction solvent to the first separated product is about 1:1 to about 7:1, preferably about 1.5:1 to about 5:1. Other conventional extraction methods may also be adopted, of which the detailed description is omitted herein for brevity.

According to the present application, the pitch obtained in step 3) is the component of the conversion product having the highest boiling point, the higher its softening point the more completely those easily processable components of the conversion product are separated, but in order to maintain the fluidity of the pitch during transport through pipelines and the solubility of the pitch when recycling to the conversion reactor, the softening point of the pitch obtained in step 3) is preferably less than about 150° C. more preferably less than about 120° C.

According to the present application, when the conversion reaction is carried out in a slurry bed reactor, the conversion catalyst in the slurry bed reactor will be passed to subsequent separation steps along with the conversion product and remained in the pitch, and the metal content in the whole reaction system will be increased along with the increase of the amount of the catalyst added and the accumulation of the metal component in the inferior oil. In order to maintain the balance of the metals in the system, it is necessary to discharge the pitch intermittently or continuously, preferably discard a part of the pitch, the proportion of the discarded pitch relative to the total amount of the pitch is preferably about 5-70 wt %, more preferably about 10-50 wt %; also in order to make a full use of the inferior oil, it is preferable to recycle a part of the pitch to step 1) in step 7), the proportion of the pitch recycled is preferably about 30-95 wt %, more preferably about 50-90 wt %. The ratio of the discarded pitch to the recycled pitch can be adjusted by the person skilled in the art according to the metal contents of the inferior oil, of which the detailed description is omitted herein for brevity.

According to the present application, in order to facilitate the production of the chemical raw material, namely light olefins, the upgraded oil obtained is subjected to hydro-upgrading in the step 4), the hydro-upgraded oil obtained is split into hydro-upgraded light oil and hydro-upgraded heavy oil in the step 5), and the split point between the hydro-upgraded light oil and the hydro-upgraded heavy oil can be about 340-360° C., preferably about 345-355° C. and more preferably about 350° C.; and the hydro-upgraded heavy oil obtained is subjected to catalytic cracking in the step 6) to obtain a catalytic cracking product containing a light olefin. The catalytic cracking product can be separated to obtain dry gas, light olefin, gasoline, cycle oil and slurry oil. The "cycle oil" generally comprises light cycle oil and heavy cycle oil, wherein the light cycle oil, which may also be referred to as diesel oil, refers to a fraction having a boiling point between 205° C. and 350° C. obtained by catalytic cracking reaction, and the heavy cycle oil refers to a fraction having a boiling point between 343° C. and 500° C.; the "slurry oil" generally refers to the stream withdrawn from the bottom of the settler in which the bottom oil obtained from the fractionation of catalytic cracking product is separated, and the stream withdrawn from the top of the settler is generally referred to as clarified oil.

Optionally, the slurry oil obtained can be recycled to the step 1) for conversion reaction; the $C_3$ and $C_4$ hydrocarbons obtained are subjected to alkane-olefin separation, and the $C_3$ and $C_4$ alkanes obtained are sent to the step 3) for use as an extraction solvent; and/or, the cycle oil obtained is subjected to hydro-upgrading separately or together with the upgraded oil. In the process of the present application, recycling of the slurry oil for conversion reaction can be realized, so that, on one hand, the utilization rate of the feedstock can be improved, and the slurry oil with low added value can be converted into a gasoline product rich in aromatics with high added value; on the other hand, the stability of the conversion unit can be improved, and the operation period of the device can be prolonged, since the slurry oil is rich in aromatic components. Meanwhile, at least a part of the second separated product obtained in step 2b) and/or the atmospheric gas oil obtained in step 2c) can be catalytically cracked together with the hydro-upgraded heavy oil in the step 6). By step 6) and the above-described steps, maximized production of chemical raw materials from inferior oils can be realized and the utilization rate of the upgraded oil and the second separated product can be improved.

According to the present application, said hydro-upgrading involved in step 4) may be that well known to the person skilled in the art and can be carried out in any way known in the art, without any particular limitation, in any hydrotreating unit known in the art (such as fixed bed reactor, fluidized bed reactor), which can be reasonably selected by the person skilled in the art. For example, the hydro-upgrading may be carried out under conditions including: a hydrogen partial pressure of about 5.0-20.0 MPa, preferably about 8-15 MPa; a reaction temperature between about 330° C. and 450° C., preferably between about 350° C. and 420° C.; a volume space velocity of about 0.1-3 $h^{-1}$, preferably about 0.3-1.5 $h^{-1}$; a hydrogen-to-oil volume ratio between about 300 and 3000, preferably between about 800 and 1500; a catalyst used for the hydro-upgrading including a hydrorefining catalyst and/or a hydrocracking catalyst. The hydrorefining catalyst and the hydrocracking catalyst may be any catalysts conventionally used in the art for this purpose, or may be produced by any method conventionally known in the art, and the amounts of the hydrorefining catalyst and the hydrocracking catalyst used in the step may be determined in accordance with conventional knowledge in the art, without any particular limitation.

For instance, the hydrorefining catalyst may comprise a carrier and an active metal component selected from a Group VIB metal and/or a Group VIII non-noble metal, particularly a combination of nickel and tungsten, a combination of nickel, tungsten and cobalt, a combination of nickel and molybdenum, or a combination of cobalt and molybdenum. These active metal components may be used alone or in combination at any ratio. Examples of the carrier include alumina, silica, and amorphous silica-alumina. These carriers may be used alone or in combination at any ratio. Preferably, the hydrorefining catalyst may comprise about 30-80 wt % of an alumina carrier, about 5-40 wt % of molybdenum oxide, about 5-15 wt % of cobalt oxide and about 5-15 wt % of nickel oxide, based on the dry weight of the hydrorefining catalyst. Hydrorefining catalysts having other compositions may also be employed by those skilled in the art.

The hydrocracking catalyst normally comprises a carrier, an active metal component and a cracking active component. More specifically, examples of the active metal component include sulfides of Group VIB metals, sulfides of Group VIII base metals, Group VIII noble metals, and the like, and particularly, Mo sulfides, W sulfides, Ni sulfides, Co sulfides, Fe sulfides, Cr sulfides, Pt, Pd, and the like. These active metal components may be used alone or in combination at any ratio. Examples of the cracking active component include amorphous silica-alumina, molecular sieves and the like. These cracking active components may be used alone or in combination at any ratio. Examples of the carrier include alumina, silica, titania, activated carbon and the like. These carriers may be used alone or in combination at any ratio. The contents of the carrier, the active metal component and the cracking active component are not particularly limited in the present application and may be selected in accordance with conventional knowledge in the art. Preferably, the hydrocracking catalyst may comprise about 3-60 wt % of zeolite, about 10-80 wt % of alumina, about 1-15 wt % of nickel oxide and about 5-40 wt % of tungsten oxide, based on the dry weight of the hydrocracking catalyst, wherein the zeolite is a Y zeolite. Hydrocracking catalysts having other compositions may also be employed by those skilled in the art.

In a preferred embodiment, the catalyst used for the hydro-upgrading comprises both a hydrofining catalyst and a hydrocracking catalyst, the loading volume ratio of the hydrofining catalyst to the hydrocracking catalyst is about 1:1 to about 5:1, and the hydrofining catalyst is loaded on the upstream of the hydrocracking catalyst along the flow direction of the reaction materials.

According to the present application, the catalytic cracking of step 6) may be carried out in various forms of catalytic cracking reactors, preferably in a varied-diameter dilute-phase transport bed reactor and/or a combined catalytic cracking reactor.

In a preferred embodiment, the catalytic cracking of step 6) is carried out in a varied-diameter dilute-phase transport bed reactor, wherein the varied-diameter dilute-phase transport bed reactor comprises, from bottom to top, a first reaction zone and a second reaction zone having different diameters, the ratio of the diameter of the second reaction zone to the diameter of the first reaction zone being from about 1.2:1 to about 2.0:1. Preferably, in the varied-diameter dilute-phase transport bed reactor, the reaction conditions in the first reaction zone may include: a reaction temperature of about 500-620° C., a reaction pressure of about 0.2-1.2 MPa, a reaction time of about 0.1-5.0 seconds, a weight ratio of catalyst to cracking feedstock of about 5-15, and a weight ratio of steam to cracking feedstock of about 0.05:1 to about 0.3:1; the reaction conditions in the second reaction zone may include: a reaction temperature of about 450-550° C., a reaction pressure of about 0.2-1.2 MPa, and a reaction time of about 1.0-20.0 seconds.

In another preferred embodiment, the catalytic cracking of step 6) is performed in a combined catalytic cracking reactor, wherein the combined reactor has a first reaction zone and a second reaction zone connected in series from bottom to top, the first reaction zone is a riser reactor, the second reaction zone is a fluidized bed reactor, and the fluidized bed reactor is located downstream of the riser reactor and connected with an outlet of the riser reactor, for example, it can be a combined reactor obtained by connecting a conventional catalytic cracking riser reactor and a fluidized bed reactor in series, which are well known to those skilled in the art. In particular, the riser reactor may be selected from an equal diameter riser reactor and/or an equal linear velocity riser reactor, preferably an equal diameter riser reactor. The riser reactor sequentially comprises a pre-lift section and at least one reaction zone from bottom to top, and in order to enable feedstock oil to fully react and meet the quality requirements of different target products, the number of the reaction zones can be 2-8, and preferably 2-3. Preferably, in the combined catalytic cracking reactor, the reaction conditions in the first reaction zone may include: a reaction temperature between about 560° C. and 750° C., preferably between about 580° C. and 730° C., and more preferably between about 600° C. and 700° C.; a reaction time of about 1-10 seconds, preferably about 2-5 seconds; a catalyst-to-oil ratio of about 1:1 to about 50:1, preferably about 5:1 to about 30:1; the reaction conditions in the second reaction zone may include: a reaction temperature of about 550-730° C. preferably about 570-720° C.; a weight space velocity of about 0.5-20 $h^{-1}$, preferably about 2-10 $h^{-1}$.

In a further preferred embodiment, steam may be injected into the riser reactor, preferably in the form of atomizing steam, and the weight ratio of injected steam to feedstock oil may be from about 0.01:1 to about 1:1, preferably from about 0.05:1 to about 0.5:1.

In some embodiments, the process of the present application may further comprise separating the spent catalyst from the reaction oil gas in the catalytic cracking product to obtain the spent catalyst and the reaction oil gas, separating the reaction oil gas obtained into fractions such as dry gas, liquefied gas, gasoline and diesel oil in a subsequent separation system, and further separating the dry gas and the liquefied gas in a gas separation device to obtain ethylene, propylene, and the like. The method for separating ethylene, propylene, and the like from the reaction product may adopt conventional technique in the art, and is not particularly limited in the present application, of which the detailed description is omitted herein for brevity.

In certain embodiments, the process of the present application may further comprise regenerating the spent catalyst; and preferably, at least a part of the catalyst used for the catalytic cracking reaction is regenerated catalyst, and for example, may totally be regenerated catalyst.

In certain embodiments, the process of the present application may further comprise stripping the regenerated catalyst, typically with steam, to remove impurities such as gases.

According to the present application, during regeneration, an oxygen-containing gas, which may be, for example, air, is generally introduced from the bottom of the regenerator. After the catalyst is introduced into the regenerator, the spent catalyst is contacted with oxygen for regeneration by coke-burning, the flue gas generated after the regeneration of the catalyst is subjected to gas-solid separation at the upper part of the regenerator, and then the flue gas is passed to a subsequent energy recovery system.

According to the present application, the regeneration conditions for the spent catalyst may include: a regeneration temperature of about 550-750° C., preferably about 600-730° C. and more preferably about 650-700° C.; a superficial gas linear velocity of about 0.5-3 m/s, preferably about 0.8-2.5 m/s, more preferably about 1-2 m/s, and an average residence time of the spent catalyst of about 0.6-3 minutes, preferably about 0.8-2.5 minutes, more preferably about 1-2 minutes.

According to the present application, the catalytic cracking catalyst suitable for step 6) may be various catalytic cracking catalysts conventionally used in the art. Preferably, the catalytic cracking catalyst may comprise, based on the total weight of the catalyst, about 1-60 wt % of zeolite, about 5-99 wt % of inorganic oxide, and about 0-70 wt % of clay.

According to the present application, in the catalytic cracking catalyst, the zeolite is used as an active component, and preferably, the zeolite is selected from mesoporous zeolite and/or macroporous zeolite. In a preferred embodiment, the mesoporous zeolite is present in an amount of about 50-100 wt %, preferably about 70-100 wt %, and the macroporous zeolite is present in an amount of about 0-50 wt %, preferably about 0-30 wt %, based on the total weight of the zeolite.

According to the present application, the mesoporous and macroporous zeolites have the meaning generally understood in the art, in which the average pore size of the mesoporous zeolite is 0.5-0.6 nm and the average pore size of the macroporous zeolite is 0.7-1.0 nm. For example, the macroporous zeolite may be selected from the group consisting of rare earth Y zeolite (REY), rare earth hydrogen Y zeolite (REHY), ultrastable Y zeolite obtained by different methods, high silicon Y zeolite, and mixtures of two or more thereof.

In a preferred embodiment, the mesoporous zeolite may be selected from zeolites having a MFI structure, such as ZSM series zeolites and/or ZRP zeolites. Optionally, the mesoporous zeolite may be modified with a nonmetallic element such as phosphorus and/or a transition metal element such as iron, cobalt, and nickel. For a more detailed description of ZRP zeolites, reference may be made to U.S. Pat. No. 5,232,675, which is incorporated herein by reference in its entirety; the ZSM-series zeolite may be selected from the group consisting of ZSM-5, ZSM-11, ZSM-12, ZSM-23, ZSM-35, ZSM-38, ZSM-48, other zeolites having a similar structure, or mixtures of two or more thereof, more detailed description of ZSM-5 may be found in U.S. Pat. No. 3,702,886, which is incorporated herein by reference in its entirety.

According to the present application, in the catalytic cracking catalyst, the inorganic oxide is used as a binder, and is preferably selected from silica ($SiO_2$) and/or alumina ($Al_2O_3$).

According to the present application, in the catalytic cracking catalyst, the clay is used as a matrix (i.e. support), and is preferably selected from kaolin and/or halloysite.

In a particularly preferred embodiment, the process of the present application comprises the steps of:

1) subjecting an inferior oil feedstock to thermal conversion reaction in the presence of hydrogen to obtain a conversion product, wherein the conversion rate of the conversion reaction is about 30-70 wt %, and the conversion rate=(weight of components having a boiling point above 524° C. in the inferior oil−weight of components having a boiling point above 524° C. in the conversion product)/weight of components having a boiling point above 524° C. in the inferior oil×100 wt %;

2) subjecting the conversion product obtained in step 1) to a first separation to obtain a first separated product, wherein the content of components having a boiling point below 350° C. in the first separated product is not greater than about 5 wt %, preferably less than about 3 wt %, the content of components having a boiling point between 350° C. and 524° C. (preferably between 355° C. and 500° C. or between 380° C. and 524° C., further preferably between 400° C. and 500° C.) is about 20-60 wt %, preferably about 25-55 wt %, and the initial boiling point of the first separated product is not lower than about 300° C., preferably not lower than about 330° C., and more preferably not lower than about 350° C.;

3) subjecting the first separated product obtained in step 2) to a second separation to obtain an upgraded oil and a pitch, wherein the second separation is selected from vacuum distillation, solvent extraction or a combination of vacuum distillation and solvent extraction;

4) subjecting the upgraded oil obtained in step 3) to hydro-upgrading to obtain a hydro-upgraded oil;

5) subjecting the hydro-upgraded oil obtained in step 4) to a third separation to obtain a hydro-upgraded heavy oil;

6) preheating the hydro-upgraded heavy oil obtained in step 5), then feeding it into the bottom of a varied-diameter dilute-phase transport bed reactor, contacting it with a regenerated catalyst to perform catalytic cracking reaction, allowing the reaction stream to flow upward and enter a cyclone separator to perform gas-solid separation, and further separating the separated reaction oil gas to obtain a product containing propylene and high-octane gasoline; stripping the separated spent catalyst and then passing it to a catalyst regenerator for regeneration by coke-burning, and recycling the regenerated catalyst to the reactor for reuse; or alternatively, preheating the hydro-upgraded heavy oil obtained in step 5), then feeding it into a first reaction zone of a combined catalytic cracking reactor, and contacting it with a regenerated catalyst to perform catalytic cracking reaction, allowing the reaction stream to flow upward and enter a second reaction zone for further catalytic cracking reaction, passing the reaction oil gas and the spent catalyst at the outlet of the reactor into a cyclone separator to perform gas-solid separation, and further separating the separated reaction oil gas to obtain a product comprising a light olefin; stripping the separated spent catalyst and passing it to a catalyst regenerator for regeneration by coke-burning, and recycling the regenerated catalyst to the reactor for reuse, wherein the light olefin includes ethylene, propylene and butylene; and 7) recycling the pitch obtained in step 3) to the step 1) for conversion reaction; or, discarding the pitch obtained in step 3); or recycling a part of the pitch obtained in step 3) to the step 1) for conversion reaction, and discarding the rest of the pitch.

In a second aspect, the present application provides a system for producing light olefins from inferior oils, including a conversion reaction unit, a first separation unit, a second separation unit, a hydro-upgrading unit, a third separation unit and a catalytic cracking unit, wherein:

the conversion reaction unit is configured to carry out a thermal conversion reaction on an inferior oil feedstock in the presence of hydrogen to obtain a conversion product;

the first separation unit is configured to separate the conversion product to obtain a first separated product, wherein in the first separated product, the content of components having a boiling point below 350° C. is not greater than about 5 wt %, and the content of components having a boiling point between 350° C. and 524° C. is about 20-60 wt %;

the second separation unit is configured to separate the first separated product into an upgraded oil and a pitch, and is selected from a vacuum distillation unit, a solvent extraction unit or a combination thereof;

the hydro-upgrading unit is configured to carry out hydro-upgrading reaction on the upgraded oil to obtain a hydro-upgraded oil;

the third separation unit is configured to separate the hydro-upgraded oil to obtain a hydro-upgraded heavy oil; and the catalytic cracking unit is configured to carry out catalytic cracking reaction on the hydro-upgraded heavy oil to obtain a catalytic cracking product comprising a light olefin.

According to certain embodiments of the present application, in the conversion reaction unit, the inferior oil, hydrogen and conversion catalyst are reacted in the conversion reactor to obtain a conversion product, which is then sent to the first separation unit. Preferably, the conversion reactor is a slurry bed reactor.

According to certain embodiments of the present application, in the first separation unit, the conversion product is first separated into a gaseous product and a liquid product, and then the liquid product is further separated to obtain a heavy fraction having a distillation range greater than about 350° C. as the first separated product, which is then sent to a second separation unit.

According to certain embodiments of the present application, in the second separation unit, the first separated product is separated in a vacuum distillation column, or is subjected to extractive separation in an extraction column by counter currently contacting with an extraction solvent to obtain the upgraded oil and the pitch, or is separated in a combination of vacuum distillation and extractive separation to obtain the upgraded oil and the pitch, and the upgraded oil is sent to a hydro-upgrading unit. Optionally, the pitch is recycled to the conversion reaction unit for further conversion.

According to certain embodiments herein, in the hydro-upgrading unit, the upgraded oil is reacted in the presence of a hydrotreating catalyst to obtain a hydro-upgraded oil, which is then sent to a third separation unit.

According to certain embodiments of the present application, in the third separation unit, the hydro-upgraded oil is split into a hydro-upgraded light oil and a hydro-upgraded heavy oil, and the hydro-upgraded heavy oil is sent to a catalytic cracking unit.

According to certain embodiments of the present application, the catalytic cracking unit comprises a varied-diameter dilute-phase transport bed reactor and/or a combined catalytic cracking reactor, wherein the varied-diameter dilute-phase transport bed reactor comprises, from bottom to top, a first reaction zone and a second reaction zone having different diameters, the ratio of the diameter of the second reaction zone to the diameter of the first reaction zone is from about 1.2:1 to about 2.0:1; the combined catalytic cracking reactor comprises a first reaction zone and a second reaction zone from bottom to top, wherein the first reaction zone is a riser reactor, and the second reaction zone is a fluidized bed reactor.

According to a preferred embodiment of the present application, in the catalytic cracking unit, a catalytic cracking catalyst is fed to a pre-lift section of a first reaction zone of a varied-diameter dilute-phase transport bed reactor, and flows upward under the action of a pre-lifting medium, and the preheated hydro-upgrading heavy oil and atomizing steam are injected into the first reaction zone together, contacted with a regenerated catalyst to perform a catalytic cracking reaction and flow upward at the same time, and then enter a second reaction zone for further reaction to obtain a catalytic cracking product comprising a light olefin. Optionally, the catalytic cracking product is separated in a subsequent separation system to obtain fractions such as ethylene, propylene and gasoline with a high octane number; the separated spent catalyst is passed to a regenerator for regeneration by coke-burning, and the regenerated catalyst with recovered activity is recycled to the varied-diameter dilute-phase transport bed reactor for reuse.

According to another preferred embodiment of the present application, in the catalytic cracking unit, the catalytic cracking catalyst is fed to a pre-lift section of a first reaction zone of a combined catalytic cracking reactor, and flows upward under the action of a pre-lifting medium, the preheated hydro-upgraded oil and atomizing steam are injected into the first reaction zone together, contacted with a regenerated catalyst to perform the catalytic cracking reaction and flow upward at the same time, and then enter a second reaction zone for further reaction to obtain a catalytic cracking product containing a light olefin. Optionally, the catalytic cracking product is separated in a subsequent separation system to obtain fractions such as ethylene, propylene, and cracking gasoline; the separated spent catalyst is passed to a regenerator for regeneration by coke-burning, and the regenerated catalyst with recovered activity is recycled to the combined catalytic cracking reactor for reuse.

The following detailed description of embodiments of the present application is provided with reference to the accompanying drawings.

As shown in FIGS. 1a, 1b, 2a and 2b, an inferior feedstock is transferred via pipeline 1, a conversion catalyst is transferred via pipeline 2, a fresh hydrogen is transferred via pipeline 3, a recycle hydrogen is transferred via pipeline 4, a catalytic slurry is transferred via pipeline 57 and a pitch is transferred via pipeline 5 to a conversion reactor 6 for thermal conversion reaction. The conversion product is sent to a high pressure separation unit 8 for pressure distillation via pipeline 7, and is separated into a gas component and a liquid component, and then the gas component is sent to the conversion reactor 6 via pipeline 9 and pipeline 4 as recycle hydrogen or sent to a hydro-upgrading unit 23 via pipeline 9 and pipeline 11 as hydrogen source. The liquid component is sent via pipeline 10 to a low pressure separation unit 12 and separated into a second separated product and a first separated product by abrupt pressure drop. The second separated product is passed to a hydro-upgrading unit 23 through pipeline 14, the first separated product is passed to a second separating unit 17 through pipeline 15 for vacuum distillation to obtain an upgraded oil and a pitch (see FIGS. 1a and 2a), or the first separated product is counter currently contacted with an extraction solvent from pipeline 16 and/or pipeline 55 for extractive separation in a second separating unit 17 to obtain an upgraded oil and a pitch (sec FIGS. 1b and 2b). A part of the pitch is discarded through pipeline 19 and pipeline 20, and the rest is recycled to the conversion reactor 6 through pipeline 19 and pipeline 5 for further reaction together with the inferior oil feedstock.

Alternatively, all of the pitch may be discarded via pipelines 19 and 20 without being recycled. The upgraded oil withdrawn through pipeline 18 is mixed with the second separated product from pipeline 14 and the catalytic diesel oil from pipeline 21, and is fed to the hydro-upgrading unit 23 through pipeline 22 for hydro-upgrading, the resulting hydro-upgraded product is separated, the resulting light components and hydro-upgraded light oil are respectively withdrawn through pipeline 24 and pipeline 25, or the hydro-upgraded light oil withdrawn through pipeline 25 is mixed with the hydro-upgraded heavy oil withdrawn through pipeline 26 and is sent to a first reaction zone 29 of a catalytic cracking unit (i.e. the varied-diameter dilute-phase transport bed reactor shown in FIGS. 1a and 1b, or the combined catalytic cracking reactor shown in FIGS. 2a and 2b) through pipeline 28. Meanwhile, the pre-lifting medium is also fed to the first reaction zone 29 through pipeline 50. The regenerated catalyst from pipeline 48 is fed to the first reaction zone 29 after being regulated by the regenerated catalyst slide valve 49, and flows upward along the riser under the action of the pre-lifting medium, the preheated hydro-upgraded oil is injected into the first reaction zone 29 through pipeline 28 together with the atomizing steam from pipeline 27, and is mixed with the stream in the first reaction zone 29. The feedstock oil undergoes a catalytic cracking reaction on the hot catalyst and flows upward, and then enters the second reaction zone 30 of the catalytic cracking unit for further reaction. The generated oil gas product and inactivated spent catalyst are passed to a cyclone separator 34 in a disengager 33 to perform the separation of the spent catalyst and the oil gas product, the oil gas product is passed to a gas collection chamber 35, and fine catalyst powders are returned to the disengager. Spent catalyst in the disengager flows to the stripping section 32 where it contacts steam from pipeline 31. The oil gas product stripped out from the spent catalyst is passed to the gas collection chamber 35 after passing through the cyclone separator. The stripped spent catalyst is passed to a regenerator 39 after being regulated by a spent catalyst slide valve 38, and air from pipeline 44 is fed to the regenerator 39 after being distributed by an air distributor 43. Coke on the spent catalyst is burnt out in a dense bed at the bottom of the regenerator 39, so as to regenerate the deactivated spent catalyst, and flue gas is passed to a subsequent energy recovery system through flue gas pipeline 41 at an upper part of a cyclone separator 40. The pre-lifting medium can be dry gas, steam or a mixture thereof.

The regenerated catalyst is fed to a degassing tank 46 through pipeline 45 communicated with a catalyst outlet of the regenerator 39, and is contacted with a stripping medium from pipeline 47 at the bottom of the degassing tank 46 to remove flue gas entrained by the regenerated catalyst. The degassed regenerated catalyst is recycled to the bottom of the first reaction zone 29 through pipeline 48, of which the circulation amount can be controlled by the regenerated catalyst slide valve 49. The gas is returned to the regenerator 39 through pipeline 42, the oil gas product in the gas collection chamber 35 is passed to a subsequent separation system 58 through vapor line 36, $H_2$ and C1-C2 alkane obtained through separation are withdrawn through pipeline 53, and the light olefin (including C2, C3 and C4 olefins) obtained is sent out of the system through pipeline 54; C3 and C4 alkanes are sent out of the system through pipeline 55 or sent into the second separation unit 17 for use as an extraction solvent, the gasoline obtained rich in aromatics is withdrawn through pipeline 56 as a product, the cycle oil obtained is withdrawn through pipeline 21 and is mixed with the upgraded oil from pipeline 18 and the second separated product from pipeline 14, and then sent to the hydro-upgrading unit 23 for hydro-upgrading, and the slurry oil obtained is withdrawn through pipeline 57 and recycled to the conversion reactor 6 for thermal conversion reaction.

Figure 1B:
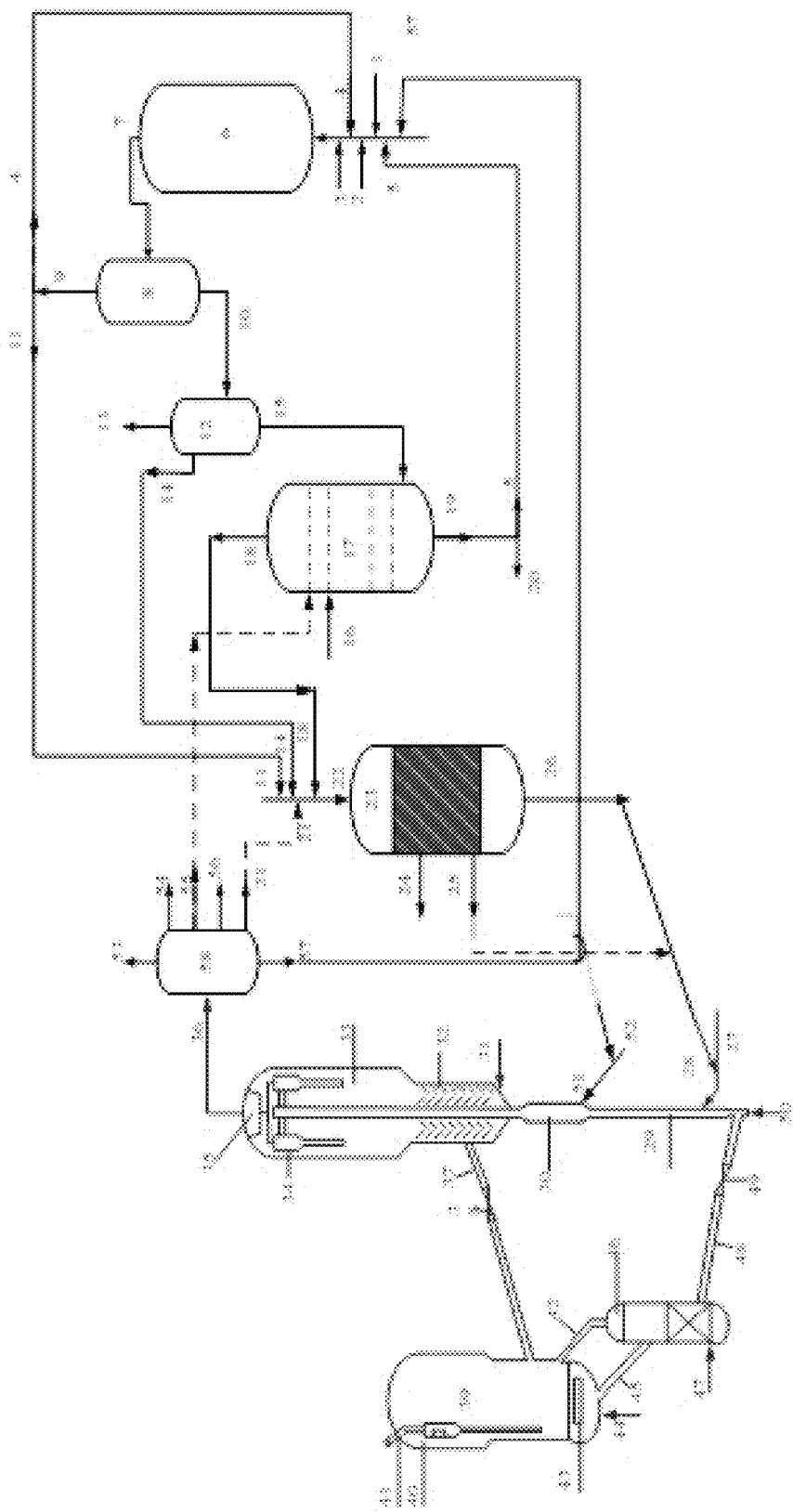
FIG. 1b shows a schematic diagram of another preferred embodiment of the process and system of the present application.

Optionally, as shown in FIGS. 1a and 1b, C4 or light gasoline fraction separated from the catalytic cracking product can be recycled to a second reaction zone 30 of the varied-diameter dilute-phase transport bed reactor acting as the catalytic cracking unit through pipeline 52 and pipeline 51 together with steam for further cracking to increase the yield of light olefins.

In certain preferred embodiments, the present application provides the following technical solutions:

A1. a process for producing light olefins from inferior oils, comprising the steps of:
(1) feeding an inferior oil to a conversion reaction unit for conversion reaction, and separating the resulting reaction product to obtain a heavy fraction having a boiling point above about 350° C.;
(2) sending the heavy fraction into a vacuum distillation separation unit and/or an extractive separation unit for separation to obtain an upgraded oil and a pitch;
(3) feeding the upgraded oil into a hydro-upgrading unit for hydro-upgrading to obtain a hydro-upgraded oil;
(4) feeding the hydro-upgraded oil after preheating to a first reaction zone of a catalytic cracking reactor, contacting it with a regenerated catalyst to perform catalytic cracking reaction, allowing the reaction stream to flow upward and enter a second reaction zone for further catalytic cracking reaction, passing the resulting oil gas and spent catalyst at the outlet of the reactor to a cyclone separator for gas-solid separation, withdrawing the separated oil gas from the device, and further separating it to obtain a product containing a light olefin; stripping the separated spent catalyst and passing it to a catalyst regenerator for regeneration by coke-burning, and recycling the regenerated catalyst to the reactor for reuse.

A2. the process according to Item A1, wherein the inferior oil comprising at least one selected from the group consisting of inferior crude oil, heavy oil, deoiled asphalt, coal derived oil, shale oil, and petrochemical waste oil.

A3. the process according to Item A1, wherein the feedstock to be upgraded satisfies one or more the following criteria: an API degree of less than about 27, a distillation range of greater than about 350° C. an asphaltene content of greater than about 2 wt %, and a heavy metal content of greater than about 100 µg/g calculated as the total weight of nickel and vanadium.

A4. the process according to Item A1, wherein the conversion reactor of the conversion reaction unit is a fluidized bed reactor.

A5. the process according to Item A1, wherein the conversion catalyst of the conversion reaction unit comprises at least one compound selected from the group consisting of Group VB metal compounds, Group VIB metal compounds, and Group VIII metal compounds.

A6. the process according to Item A1, wherein the reaction conditions of the conversion reaction unit include: a temperature of about 380-470° C., a hydrogen partial pressure of 10-25 MPa, a volume space velocity of the inferior oil of about 0.01-2 $h^{-1}$, a volume ratio of hydrogen to the inferior oil of about 500-5000, and an amount of the conversion catalyst of about 10-50000 µg/g calculated on the basis of the metal in the conversion catalyst and relative to the weight of the inferior oil.

A7. the process according to Item A1, wherein the operating conditions of the extractive separation unit include: a pressure of about 3-12 MPa, a temperature of about 55-300° C., an extraction solvent of $C_3$-$C_7$ hydrocarbons, and a weight ratio of solvent to heavy fraction of (1-7):1, or
the operating conditions of the vacuum distillation separation unit include: a vacuum degree of about 1-20 mmHg and a temperature of about 250-350° C.

A8. the process according to Item A1, wherein the reaction conditions for hydro-upgrading unit include: a hydrogen partial pressure of about 5.0-20.0 MPa, a reaction temperature of about 330-450° C., a volume space velocity of about 0.1-3 $h^{-1}$, and a hydrogen-to-oil volume ratio of about 300-3000.

A9. the process according to Item A1, wherein the catalyst used in the hydro-upgrading unit comprises a hydrorefining catalyst and a hydrocracking catalyst, the hydrorefining catalyst comprises a carrier and an active metal component, and the active metal component is selected from Group VIB metals and/or Group VIII non-noble metals; the hydrocracking catalyst comprises a zeolite, alumina, at least one Group VIII metal component and at least one Group VIB metal component.

A10. the process according to Item A1, wherein, based on the weight of the catalyst, the hydrocracking catalyst comprises: 3-60 wt % of zeolite, 10-80 wt % of alumina, 1-15 wt % of nickel oxide and 5-40 wt % of tungsten oxide.

A11. the process according to Item A1, wherein the reactor of the catalytic cracking unit comprises a first reaction zone and a second reaction zone, the first reaction zone is a riser reactor, and the second reaction zone is a fluidized bed reactor.

A12. the process according to Item A1, wherein the conditions in the first reaction zone include: a reaction temperature of 560-750° C., a reaction time of 1-10 seconds, and a catalyst-to-oil ratio of 1-50:1; the conditions in the second reaction zone include: a reaction temperature of 550-700° C., and a space velocity of about 0.5-20 h$^{-1}$.

A13. the process according to Item A1, wherein the catalyst used in step (4) comprises: 1-60 wt % of zeolite, 5-99 wt % of inorganic oxide and 0-70 wt % of clay, based on the total weight of the catalyst, wherein the zeolite is selected from mesoporous zeolite and optional macroporous zeolite, the mesoporous zeolite accounts for 50-100 wt % of the total weight of the zeolite, and the macroporous zeolite accounts for 0-50 wt % of the total weight of the zeolite.

A14. the process according to Item A13, wherein the mesoporous zeolite accounts for 70-100 wt % of the total weight of the zeolite, and the macroporous zeolite accounts for 0-30 wt % of the total weight of the zeolite.

A15. the process according to Item A1, wherein the pitch of step (2) is recycled to step (1) for conversion reaction; or, the pitch obtained in step (2) is discarded; or a part of the pitch obtained in step (2) is recycled to step (1) for conversion reaction, and the rest of the pitch is discarded.

A16. the process according to Item A1, wherein the conversion rate of the conversion reaction is about 30-70 wt %, the conversion rate of the conversion reaction=(weight of components having a distillation range above 524° C. in the inferior oil−weight of components having a distillation range above 524° C. in the conversion product)/weight of components having a distillation range above 524° C. in the inferior oil×100 wt %; and/or the content of components having a distillation range between 350° C. and 524° C. in the heavy fraction is about 20-60 wt %.

A17. a system for producing light olefins from inferior oils, comprising a conversion reaction unit, an extractive separation or vacuum distillation separation unit, a hydro-upgrading unit and a catalytic cracking unit, wherein the conversion reaction unit is connected to the vacuum distillation and/or extractive separation unit, the vacuum distillation and/or extractive separation unit is connected to the hydro-upgrading unit, and the hydro-upgrading unit is connected to the catalytic cracking unit.

B1. an upgrading process for producing light olefins from inferior oils, comprising the steps of:
(1) subjecting an inferior oil serving as the feedstock to be upgraded to conversion reaction in the presence of hydrogen to obtain a conversion product; wherein the conversion rate of the conversion reaction is about 30-70 wt %, the conversion rate of the conversion reaction=(weight of components having a boiling point above 524° C. in the feedstock to be upgraded−weight of components having a boiling point above 524° C. in the conversion product)/weight of components having a boiling point above 524° C. in the feedstock to be upgraded×100 wt %;
(2) separating the conversion product obtained in step (1) to obtain at least a first separated product; wherein in the first separated product, the content of components having a boiling point below 350° C. is not greater than about 5 wt %, and the content of components having a boiling point between 350° C. and 524° C. is about 20-60 wt %;
(3) separating the first separated product obtained in step (2) in a vacuum distillation separation unit via vacuum distillation and/or in an extractive separation unit via extractive separation using an extraction solvent, to obtain an upgraded oil and a pitch;
(4) recycling the pitch obtained in step (3) to step (1) for conversion reaction; or, discarding the pitch obtained in step (3); or, recycling a part of the pitch obtained in step (3) to step (1) for conversion reaction, and discarding the rest of the pitch;
(5) subjecting the upgraded oil obtained in step (3) to hydro-upgrading to obtain a hydro-upgraded oil;
(6) separating the hydro-upgraded oil obtained in step (5), and subjecting the resulting hydro-upgraded heavy oil to catalytic conversion reaction to obtain a product containing a light olefin.

B2. the upgrading process according to Item B1, wherein in step (1), the conversion rate of the conversion reaction is about 30-60 wt %.

B3. the upgrading process according to Item B1, wherein in step (1), the conversion reaction is carried out in a slurry bed reactor.

B4. the upgrading process according to Item B1, wherein in step (1), the conversion reaction is carried out in the presence or absence of a conversion catalyst comprising at least one selected from the group consisting of Group VB metal compounds. Group VIB metal compounds, and Group VIII metal compounds.

B5. the upgrading process according to Item B1, wherein in step (1), the conversion reaction conditions include: a temperature of about 380-470° C. a hydrogen partial pressure of 10-25 MPa, a volume space velocity of the feedstock to be upgraded of about 0.01-2 h$^{-1}$, a volume ratio of hydrogen to the feedstock to be upgraded of about 500-5000, and an amount of the conversion catalyst of about 10-50000 μg/g calculated on the basis of the metal in the hydrogen conversion catalyst and relative to the weight of the feedstock to be upgraded.

B6. the upgrading process according to Item B1, wherein in step (1), the feedstock to be upgraded comprises at least one selected from the group consisting of inferior crude oil, heavy oil, deoiled asphalt, coal derived oil, shale oil and petrochemical waste oil.

B7. the upgrading process according to Item B1, wherein the feedstock to be upgraded satisfies one or more of the following criteria: an API degree of less than about 27, a boiling point of greater than about 350° C. an asphaltene content of greater than about 2 wt %, and a heavy metal content of greater than about 100 μg/g calculated as the total weight of nickel and vanadium.

B8. the upgrading process according to Item B1, wherein in step (2), in the first separated product, the content of components having a boiling point below 350° C. is less than about 3 wt %, and the content of components having a boiling point between 350° C. and 524° C. is about 25-55 wt %.

B9. the upgrading process according to Item B1, wherein in step (2), the separation comprises:
(2-1) separating the conversion product obtained in step (1) at a first pressure and a first temperature to obtain a gas component and a liquid component;
(2-2) separating the liquid component at a second pressure and a second temperature to obtain the first separated product and a second separated product; wherein the first pressure is greater than the second pressure.

B10. the upgrading process according to Item B9, wherein the first pressure is 10-25 MPa and the first temperature is about 380-470° C.; the second pressure is about 0.1-5 MPa and the second temperature is about 150-390° C.

B11. the upgrading process according to Item B9, wherein the separation further comprises:
 (2-3) splitting the second separated product obtained in step (2-2) to obtain a naphtha and an atmospheric gas oil; and/or
 (2-4) recycling the gas component obtained in step (2-1) to step (1) for conversion reaction and/or to step (5) for hydro-upgrading.

B12. the upgrading process according to Item B11, wherein the second separated product and/or atmospheric gas oil is hydro-upgraded together with the upgraded oil.

B13. the upgrading process according to Item B1 or B12, wherein the conditions of the hydro-upgrading of step (5) include: a hydrogen partial pressure of about 5.0-20.0 MPa, a reaction temperature of about 330-450° C., a volume space velocity of about 0.1-3 $h^{-1}$, and a hydrogen-to-oil volume ratio of about 300-3000.

B14. the upgrading process according to Item B1 or B12, wherein the catalyst used in the hydro-upgrading of step (5) comprises a hydrorefining catalyst and a hydrocracking catalyst, the hydrorefining catalyst comprises a carrier and an active metal component, and the active metal component is selected from Group VIB metals and/or Group VIII non-noble metals; the hydrocracking catalyst comprises a zeolite, alumina, at least one Group VIII metal component and at least one Group VIB metal component.

B15. the upgrading process according to Item B14, wherein the hydrocracking catalyst comprises about 3-60 wt % of zeolite, about 10-80 wt % of alumina, about 1-15 wt % of nickel oxide and about 5-40 wt % of tungsten oxide based on the dry weight of the hydrocracking catalyst.

B16. the upgrading process according to Item B1, wherein the catalytic conversion reaction of step (6) is carried out in a catalytic conversion reactor in the presence of a catalytic conversion catalyst, wherein the catalytic conversion reactor is selected from the group consisting of riser reactor, fluidized bed reactor, down-flow conveying reactor, moving bed reactor, or a composite reactor combining any two thereof.

B17. the upgrading process according to Item B1, wherein the conditions of the catalytic conversion reaction of step (6) include: a reaction temperature of 500-750° C., the reaction pressure of 0.15-0.50 MPa, a reaction time of 0.2-10 seconds, a catalyst-to-oil ratio of 5-40, and a water-to-oil ratio of 0.05-1.0.

B18. the upgrading process according to Item B1, wherein the catalytic conversion catalyst of step (6) comprises a zeolite, an inorganic oxide, and optionally a clay, in amounts of: 1-60 wt % of zeolite, 5-99 wt % of inorganic oxide and 0-70 wt % of clay, wherein the zeolite is a mixture of mesoporous zeolite and optional macroporous zeolite, the proportion of the mesoporous zeolite is 50-100 wt %, preferably 70-100 wt %, and the proportion of the macroporous zeolite is 0-50 wt %, preferably 0-30 wt %.

B19. the upgrading process according to Item B1, wherein in step (3), the extractive separation is conducted using an extraction solvent at a third temperature and a third pressure; wherein the third pressure is about 3-12 MPa, the third temperature is about 55-300° C., the extraction solvent is $C_3$-$C_7$ hydrocarbon, and the weight ratio of extraction solvent to first separated product is (1-7):1.

B20. the upgrading process according to Item B1, wherein in step (3), the pitch has a softening point of less than about 150° C.

B21. the upgrading process according to Item B1, wherein in step (4), the proportion of the pitch recycled to step (1) to the total amount of the pitch is 30-95 wt %, preferably 50-90 wt %.

B22. the upgrading process according to Item B1, wherein in step (6), the hydro-upgraded oil is split into hydro-upgraded light oil and hydro-upgraded heavy oil, and the split point between the hydro-upgraded light oil and the hydro-upgraded heavy oil is 340-360° C., preferably about 345-355° C. and more preferably about 350° C.

B23. an upgrading system for producing light olefins produced from inferior oil, comprising a hydro-conversion reaction unit, a vacuum distillation and/or an extractive separation unit, a hydro-upgrading unit and a catalytic conversion unit, wherein the hydro-conversion reaction unit is connected to the vacuum distillation and/or extractive separation unit, the vacuum distillation and/or extractive separation unit is connected to the hydro-upgrading unit, and the hydro-upgrading unit is connected to the catalytic conversion unit.

C1. a process for producing propylene and high-octane gasoline from inferior oils, comprising the steps of:
 (1) feeding an inferior oil to a conversion reaction unit for conversion reaction, and separating the resulting reaction product to obtain a heavy fraction having a distillation range above about 350° C.;
 (2) sending the heavy fraction to a vacuum distillation separation unit and/or an extractive separation unit for separation to obtain an upgraded oil and a pitch,
 (3) feeding the upgraded oil into a hydro-upgrading unit for hydro-upgrading to obtain a hydro-upgraded oil;
 (4) feeding the hydro-upgraded oil after preheating to the bottom of a varied-diameter dilute-phase transport bed reactor, contacting it with a regenerated catalyst to perform catalytic cracking reaction, allowing the reaction stream to flow upward and enter a cyclone separator for gas-solid separation, withdrawing the separated reaction oil gas from the device and further separating it to obtain a product containing propylene and high-octane gasoline; stripping the separated spent catalyst and passing it to a catalyst regenerator for regeneration by coke-burning, and recycling the regenerated catalyst to the reactor for reuse.

C2. the process according to Item C1, wherein the inferior oil comprises at least one selected from the group consisting of inferior crude oil, heavy oil, deoiled asphalt, coal derived oil, shale oil, and petrochemical waste oil.

C3. the process according to Item C1, wherein the feedstock to be upgraded satisfies one or more of the following criteria: an API degree of less than about 27, a distillation range of greater than about 350° C. an asphaltene content of greater than about 2 wt %, and a heavy metal content of greater than about 100 µg/g, calculated as the total weight of nickel and vanadium.

C4. the process according to Item C1, wherein the conversion reactor of the conversion reaction unit is a slurry bed reactor.

C5. the process according to Item C1, wherein the conversion catalyst of the conversion reaction unit comprises at least one selected from the group consisting of Group VB metal compounds. Group VIB metal compounds and Group VIII metal compounds.

C6. the process according to Item C1, wherein the reaction conditions of the conversion reaction unit include: a temperature of about 380-470° C. a hydrogen partial pressure of 10-25 MPa, a volume space velocity of the inferior oil of about 0.01-2 h$^{-1}$, a volume ratio of hydrogen to the inferior oil of about 500-5000, and an amount of the conversion catalyst of about 10-50000 μg/g calculated on the basis of the metal in the conversion catalyst and relative to the weight of the feedstock to be upgraded.

C7. the process according to Item C1, wherein the reaction conditions of the extractive separation unit include: a pressure of about 3-12 MPa, a temperature of about 55-300° C., an extraction solvent of $C_3$-$C_7$ hydrocarbon, a weight ratio of solvent to heavy fraction of (1-7):1, or the operating conditions of the vacuum distillation separation unit include: a vacuum degree of about 1-20 mmHg and a temperature of about 250-350° C.

C8. the process according to Item C1, wherein the reaction conditions for the hydro-upgrading unit include: a hydrogen partial pressure of about 5.0-20.0 MPa, a reaction temperature of about 330-450° C., a volume space velocity of about 0.1-3 h$^{-1}$, and a hydrogen-to-oil volume ratio of about 300-3000.

C9. the process according to Item C1, wherein the catalyst used in the hydro-upgrading unit comprises a hydrorefining catalyst and a hydrocracking catalyst, the hydrorefining catalyst comprises a carrier and an active metal component selected from Group VIB metals and/or Group VIII non-noble metals; the hydrocracking catalyst comprises a zeolite, alumina, at least one Group VIII metal component and at least one Group VIB metal component.

C10. the process according to Item C1, wherein, based on the weight of the catalyst, the hydrocracking catalyst comprises 3-60 wt % of zeolite, 10-80 wt % of alumina, 1-15 wt % of nickel oxide and 5-40 wt % of tungsten oxide.

C11. the process according to Item C1, wherein the varied-diameter dilute-phase transport bed comprises two reaction zones, and the ratio of the diameter of the second reaction zone to that of the first reaction zone is 1.2-2.0:1.

C12. the process according to Item C1, wherein the reaction conditions in the first reaction zone of the varied-diameter dilute-phase transport bed include: a reaction temperature of 500-620° C., a reaction pressure of 0.2-1.2 MPa, a reaction time of 0.1-5.0 seconds, a weight ratio of catalyst to feedstock of 5-15, and a weight ratio of steam to feedstock of 0.05-0.3:1.

C13. the process according to Item C1, wherein the reaction conditions in the second reaction zone of the varied-diameter dilute-phase transport bed include: a reaction temperature of 450-550° C., a reaction pressure of 0.2-1.2 MPa, and a reaction time of 1.0-20.0 seconds.

C14. the process according to Item C1, wherein the catalyst contains, based on the total weight of the catalyst, 1-60 wt % of a zeolite, 5-99 wt % of an inorganic oxide and 0-70 wt % of clay, wherein the zeolite is selected from mesoporous zeolite and optional macroporous zeolite, the mesoporous zeolite accounts for 50-100 wt % of the total weight of the zeolite, and the macroporous zeolite accounts for 0-50 wt % of the total weight of the zeolite.

C15. the process according to Item C14, wherein the mesoporous zeolite accounts for 70-100 wt % of the total weight of the zeolite and the macroporous zeolite accounts for 0-30 wt % of the total weight of the zeolite.

C16. the process according to Item C1, wherein the pitch of step (2) is recycled to step (1) for conversion reaction; or, the pitch obtained in step (2) is discarded; or a part of the pitch obtained in step (2) is recycled to step (1) for conversion reaction, and the rest of the pitch is discarded.

C17. the process according to Item C1, wherein the conversion rate of the conversion reaction is about 30-70 wt %, the conversion rate of the conversion reaction=(weight of components having a distillation range above 524° C. in the inferior oil−weight of components having a distillation range above 524° C. in the conversion product)/weight of components having a distillation range above 524° C. in the inferior oil×100 wt %; and/or the content of components having a distillation range between 350° C. and 524° C. in the heavy fraction is about 20-60 wt %.

C18. a system for producing propylene and high-octane gasoline from inferior oils, comprising a conversion reaction unit, a vacuum distillation and/or extractive separation unit, a hydro-upgrading unit and a catalytic cracking unit, wherein the conversion reaction unit is connected to the vacuum distillation and/or extractive separation unit, the vacuum distillation and/or extractive separation unit is connected to the hydro-upgrading unit, and the hydro-upgrading unit is connected to the catalytic cracking unit.

EXAMPLES

The present application will be described in further detail with reference to examples, but is not limited thereto.

In the context of the present application, including the following examples and comparative examples:

the heavy metal content (calculated as the total weight of nickel and vanadium) in the oil is determined according to ASTM D5708;

the asphaltene content in the oil is determined according to SH/T0266-92 (1998);

the discard rate of pitch=weight of discarded pitch/ with of inferior oil×100 wt %;

Conversion rate of inferior oil=(1−discard rate of pitch)×100 wt %;

LPG+liquid product yield=(total weight of LPG and liquid product obtained by first and second separation of conversion product)/weight of inferior oil×100 wt %;

Yield of first separated product=weight of first separated product/weight of inferior oil×100 wt %

Yield of toluene insolubles=(weight of toluene insolubles in first separated product/weight of first separated product)×yield of first separated product×100%;

the softening point of the pitch is determined according to GB/T4507-84;

the special component refers to the component having a boiling point of 350-524° C. in the first separated product;

Ethylene yield=ethylene weight/weight of catalytic cracking feedstock oil×100 wt %;

Propylene yield=propylene weight/weight of catalytic cracking feedstock oil×100 wt %;

Butene yield=butene weight/weight of catalytic cracking feedstock oil×100 wt %;

Yield of light olefins=ethylene yield+propylene yield+butylene yield.

The following examples and comparative examples were carried out in accordance with the embodiments shown in the drawings.

In the following examples and comparative examples, the inferior oil B used was a vacuum residue, and its properties are shown in Table 1.

TABLE 1

Properties of feedstocks used in examples and comparative examples

| Name | Inferior oil B |
|---|---|
| Density (20° C.)/(kg/m$^3$) | 1060.3 |
| API degree | 1.95 |
| Carbon residue/wt % | 23.2 |
| Element content/wt % | |
| Carbon | 84.62 |
| Hydrogen | 10.07 |
| Sulfur | 4.94 |
| Nitrogen | 0.34 |
| Oxygen | / |
| Four-component composition/wt % | |
| Saturated component | 9.0 |
| Aromatic component | 53.8 |
| Resin | 24.5 |
| Asphaltenes | 12.7 |
| Metal content/(μg/g) | |
| Ca | 2.4 |
| Fe | 23.0 |
| Ni | 42.0 |
| V | 96.0 |
| Content of components >524° C./wt % | 100 |

Examples 1 and 3

On a medium-sized device, conversion reaction was carried out in a slurry bed reactor using inferior oil B as a feedstock, followed by a first separation carried out in two fractionating towers to obtain a first separated product and a second separated product. The first separated product was subjected to a second separation (extractive separation shown in FIGS. 1b and 2b was performed in Example 1, and vacuum distillation shown in FIGS. 1a and 2a was performed in Example 3) to obtain an upgraded oil and a pitch. The specific conditions and results of each step are shown in Table 2-1 and Table 2-2.

Examples 2 and 4

On a medium-sized device, conversion reaction was carried out in a slurry bed reactor using inferior oil B as a feedstock, followed by a first separation carried out in two fractionating towers to obtain a first separated product and a second separated product. The first separated product was subjected to a second separation (extractive separation shown in FIGS. 1b and 2b was performed in Example 2, and vacuum distillation shown in FIGS. 1a and 2a was performed in Example 4) to obtain an upgraded oil and a pitch. A part of the pitch obtained was recycled, and the rest was discarded. The recycled pitch was mixed with the inferior oil B. and then subjected to conversion reaction, followed sequentially by first separation and second separation to obtain an upgraded oil and a pitch. The second separated product obtained was further separated to obtain a naphtha fraction and an atmospheric gas oil. The specific conditions and results of each step are shown in Table 2-1 and Table 2-2.

Comparative Example 1

The same basic procedure as in Example 1 was carried out, except that the conversion reaction and the first separation were not conducted. The specific conditions and results of each step are shown in Tables 2-1 and 2-2.

Comparative Example 2

The same basic procedure as in Example 2 was carried out, except that the conversion reaction and the first separation were not conducted. The specific conditions and results of each step are shown in Tables 2-1 and 2-2.

Comparative Example 3

The same basic procedure as in Example 2 was carried out, but the conversion catalyst and operating conditions used were different. The specific conditions and results of each step are shown in Tables 2-1 and 2-2.

TABLE 2-1

Reaction conditions used in examples and comparative examples

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Inferior oil feedstock | Inferior oil B | Inferior oil B | Inferior oil B | Inferior oil B | Inferior oil B | Inferior oil B | Inferior oil B |
| Recycle of pitch | No | Yes | No | Yes | No | Yes | Yes |
| Conversion reaction | | | | | | | |
| Reaction temperature/° C. | 430 | 430 | 430 | 410 | — | — | 420 |
| Reaction pressure/MPa | 17 | 18 | 16 | 16 | — | — | 18 |
| Conversion catalyst (the values in parentheses are the wt % of the catalyst component) | Ammonium molybdate | Ammonium molybdate | Molybdenum octoate | Molybdenum naphthenate (75%) + nickel naphthenate (25%) | — | — | Hematite |
| Volume space velocity/h$^{-1}$ | 0.5 | 0.20 | 0.2 | 0.12 | — | — | 0.3 |
| Catalyst amount/(ug/g) | 1000 | 1000 | 1500 | 300 | — | — | 1500 |
| Hydrogen partial pressure/MPa | 15.8 | 17.1 | 15 | 15 | — | — | 17.4 |
| Volume ratio of hydrogen to linferior oil | 2000 | 1200 | 1200 | 1500 | — | — | 800 |
| First separation unit | | | | | | | |
| First pressure/MPa | 17 | 17 | 16 | 16 | — | — | 18 |
| First temperature/° C. | 420 | 410 | 420 | 410 | — | — | 390 |
| Second pressure/MPa | 4.0 | 0.22 | 0.1 | 0.1 | — | — | 5.0 |
| Second temperature/° C. | 380 | 360 | 370 | 360 | — | — | 290 |
| Second separation unit | | | | | | | |

TABLE 2-1-continued

Reaction conditions used in examples and comparative examples

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Extraction solvent | n-$C_4H_S$ | Catalytic cracking $C_3$, $C_4$ alkanes | — | — | n-$C_4H_8$ | n-$C_4H_8$ | n-$C_4H_8$ |
| Operating temperature/° C. | 130 | 120 | 350 | 330 | 130 | 130 | 130 |
| Ratio of solvent (by mass) | 2.5 | 3.5 | — | — | 3.5 | 3.5 | 3.5 |
| Operating pressure/MPa | 4.0 | 5.0 | Vacuum of 3 mmHg | Vacuum of 3 mmHg | 4.0 | 4.0 | 4.0 |

*Sources of each conversion catalyst are as follows:
Ammonium molybdate: Beijing reagent company, reagent pure grade;
Molybdenum octoate: a product prepared in laboratory, purity > 90%;
Molybdenum naphthenate: a product prepared in laboratory, purity > 85%;
Nickel naphthenate: a product prepared in laboratory, purity > 90%;
Hematite: an industrial product.

TABLE 2-2

| Item | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Conversion rate of conversion reaction /% | 40.2 | 56.8 | 45.3 | 54.8 | — | — | 55.6 |
| Product distribution/wt % | | | | | | | |
| First separated product | 55.3 | 69.4 | 80.7 | 88.7 | — | — | 70.4 |
| Content of components having a boiling point less than 350° C. in the first separated product/wt % | 1 | 2 | 3.3 | 3 | — | — | 15 |
| Boiling point of the special component of the first separated product/° C. | 350-524 | 350-524 | 350-520 | 350-500 | — | — | 350-524 |
| Content of the special component in first separated product/wt % | 29 | 38 | 30 | 28 | — | — | 37 |
| End boiling point of second separated product/° C. | 334 | 348 | 342 | 345 | — | — | 285 |
| Upgrade result | | | | | | | |
| Discard rate of pitch/%) | 51.6 | 5.2 | 37.5 | 6.9 | 65.8 | 74.9 | 17.6 |
| Conversion of inferior oil/%) | 48.4 | 94.8 | 62.5 | 93.1 | 34.2 | 25.1 | 82.4 |
| LPG + liquid product yield/%) | 45.6 | 89.5 | 55.7 | 84.5 | 34.2 | 25.1 | 78.2 |
| Heavy Metal content of upgraded oil/weight (μg/g) | <1 | <1 | <1 | <1 | 8 | 30 | 20 |
| Asphaltene content of upgraded oil/wt % | <0.1 | <0.1 | <0.1 | <0.1 | 1.5 | 3.2 | 2.8 |
| Yield of toluene insolubles/%) | 0.2 | 0.4 | 0.6 | 0.5 | | | 1.1 |

The results in Table 2-2 show that if the inferior oil is directly subjected to extractive separation without conversion reaction, the yield of LPG+liquid product is only 34.2%, and the yield of pitch is 65.8%; if the pitch is recycled, the yield of LPG+liquid product is only 25.1% and the yield of pitch is as high as 74.9%.

In another aspect, the results of Comparative Example 3 show that when the content of components having a boiling point less than 350° C. in the first separated product is out of the range defined in the present application, the conversion rate of inferior oil is decreased by 12% and the yield of LPG+liquid product is decreased by 11%, while the heavy metal content of the upgraded oil reaches 20 u g/g and the yield of toluene insolubles is increased by about 1%.

Examples 5 to 6

The upgraded oils obtained in Examples 2 and 4 were respectively sent to a hydro-upgrading unit, and subjected to hydro-upgrading at hydrofining and cracking temperatures of 380-386° C., a volume space velocity of 0.5 $h^{-1}$, a hydrogen-to-oil volume ratio of 1000 and a hydrogen partial pressure of 15 MPa to obtain a hydro-upgraded oil. The hydro-upgraded oil was simply separated to obtain a hydro-upgraded heavy oil. Test conditions and properties of the hydro-upgraded heavy oil are shown in Table 3.

Comparative Examples 4 to 5

Like in Examples 5-6, the upgraded oils obtained in Comparative Examples 1-2 were subjected to hydro-upgrading to obtain a hydro-upgraded oil, and the hydro-upgraded oil was simply separated to obtain a hydro-upgraded heavy oil. Test conditions and properties of the hydro-upgraded heavy oil are shown in Table 3.

TABLE 3

Hydro-upgrading conditions and results for each example and comparative example

| Item | Ex. 5 | Ex. 6 | Comp. Ex. 4 | Comp. Ex. 5 |
|---|---|---|---|---|
| Source of hydro-upgraded feedstock oil | Ex. 2 | Ex. 4 | Comp. Ex. 1 | Comp. Ex. 2 |
| Hydrorefining/cracking reaction temperature/° C. | 380/380 | 382/383 | 384/385 | 385/386 |
| Trade name of hydrofining/cracking catalyst | | | RN-410/RHC-131* | |
| Total volume space velocity/$h^{-1}$ | 0.5 | 0.5 | 0.5 | 0.5 |
| Hydrogen-to-oil volume ratio | 1000 | 1000 | 1000 | 1000 |
| Hydrogen partial pressure/MPa | 15 | 15 | 15 | 15 |
| Properties of hydro- | | | | |

TABLE 3-continued

Hydro-upgrading conditions and results for each example and comparative example

| Item | Ex. 5 | Ex. 6 | Comp. Ex. 4 | Comp. Ex. 5 |
|---|---|---|---|---|
| upgraded heavy oil | | | | |
| Density (20° C.)/(kg/m³) | 890 | 895 | 901 | 903 |
| Sulfur/(μg/g) | <200 | <200 | <200 | <200 |
| Ni + V/(μg/g) | <1 | <1 | <1 | <1 |
| Hydrogen content/% | 12.90 | 12.86 | 12.70 | 12.65 |

*Each hydrorefining/cracking catalyst is obtained from Sinopec Catalyst Co., Ltd.

Examples 7 to 8

The hydro-upgraded heavy oils obtained in Example 5 and Example 6 were subjected to catalytic cracking (reactor type as shown in FIGS. 1a and 1b) on a medium-size device using a catalyst available from Qilu Catalyst Branch under the trade name CGP. Preheated hydro-upgraded oil was fed to a first reaction zone of a varied-diameter dilute-phase transport bed reactor and reacted under conditions including a reaction temperature of 535° C., a reaction time of 1.8 seconds, a catalyst-to-feedstock oil weight ratio of 8, and a steam-to-feedstock oil weight ratio of 0.10. The oil-gas mixture (vapor) and the catalyst flowed upward and entered a second reaction zone, and further reaction was carried out under conditions including a reaction temperature of 510° C. and a reaction time of 2.5 seconds. The reaction oil gas and the spent catalyst were passed to a cyclone separator from the outlet of the reactor to allow a quick separation of the reaction oil gas and the spent catalyst, and the reaction oil gas was split in a separation system according to the distillation range to obtain fractions such as propylene, gasoline and the like; the spent catalyst was passed to a steam stripping section under the action of gravity to strip off hydrocarbon products adsorbed on the spent catalyst by steam, and the stripped catalyst was passed to a regenerator to contact with air for regeneration; the regenerated catalyst was passed to a degassing tank to remove non-hydrocarbon gas impurities adsorbed on and carried by the regenerated catalyst, the degassed regenerated catalyst was recycled to the varied-diameter dilute-phase transport bed reactor for reuse. Operation conditions of the catalytic cracking unit and product distribution are listed in Table 4.

As can be seen from the results in Table 4, for the hydro-upgraded heavy oil, the propylene yield can reach 9.3 wt %, the gasoline yield can reach about 48.5 wt %, and the octane number can reach as high as 98.2.

Comparative Examples 6 to 7

Substantially the same procedure as in Examples 7-8 was carried out, except that the feedstocks were the hydro-upgraded heavy oils obtained in Comparative Examples 4-5, respectively. Operation conditions of the catalytic cracking unit and product distribution are listed in Table 4.

As can be seen from the results in Table 4, for the hydro-upgraded heavy oil, the propylene yield was only 6.2 wt %, the gasoline yield was only 35.8 wt %, and the octane number was only 92.

TABLE 4

Catalytic cracking reaction conditions and results of Examples 7 to 8 and Comparative Examples 6 to 7

| Item | Ex. 7 | Ex. 8 | Comp. Ex. 6 | Comp. Ex. 7 |
|---|---|---|---|---|
| Source of catalytic cracking feedstock oil (hydro-upgraded heavy oil) | Ex. 5 | Ex. 6 | Comp. Ex. 4 | Comp. Ex. 5 |
| First reaction zone of varied-diameter reactor | | | | |
| Reaction temperature/° C. | 535 | 535 | 535 | 535 |
| Reaction time/second | 1.8 | 1.8 | 1.8 | 1.8 |
| Weight ratio of catalyst to cracking feedstock | 8 | 8 | 8 | 8 |
| Weight ratio of steam to cracking feedstock | 0.1 | 0.1 | 0.1 | 0.1 |
| Second reaction zone of varied-diameter reactor | | | | |
| Reaction temperature/° C. | 510 | 510 | 510 | 510 |
| Reaction time/second | 2.5 | 2.5 | 2.5 | 2.5 |
| Catalytic cracking product distribution/wt % | | | | |
| Dry gas | 2.7 | 2.8 | 3.0 | 3.1 |
| Liquefied gas | 20.3 | 19.1 | 14.1 | 13.1 |
| Propylene therein | 9.4 | 9.3 | 6.2 | 6.0 |
| Gasoline | 47.8 | 48.5 | 35.8 | 35.2 |
| Diesel oil | 15.8 | 15.4 | 29.4 | 30.1 |
| Heavy oil | 4.4 | 4.7 | 8.4 | 8.9 |
| Coke | 9.0 | 9.5 | 9.3 | 9.6 |
| Research octane number of gasoline | 98 | 98.2 | 92 | 92.2 |

Examples 9 to 10

Figure 2A:
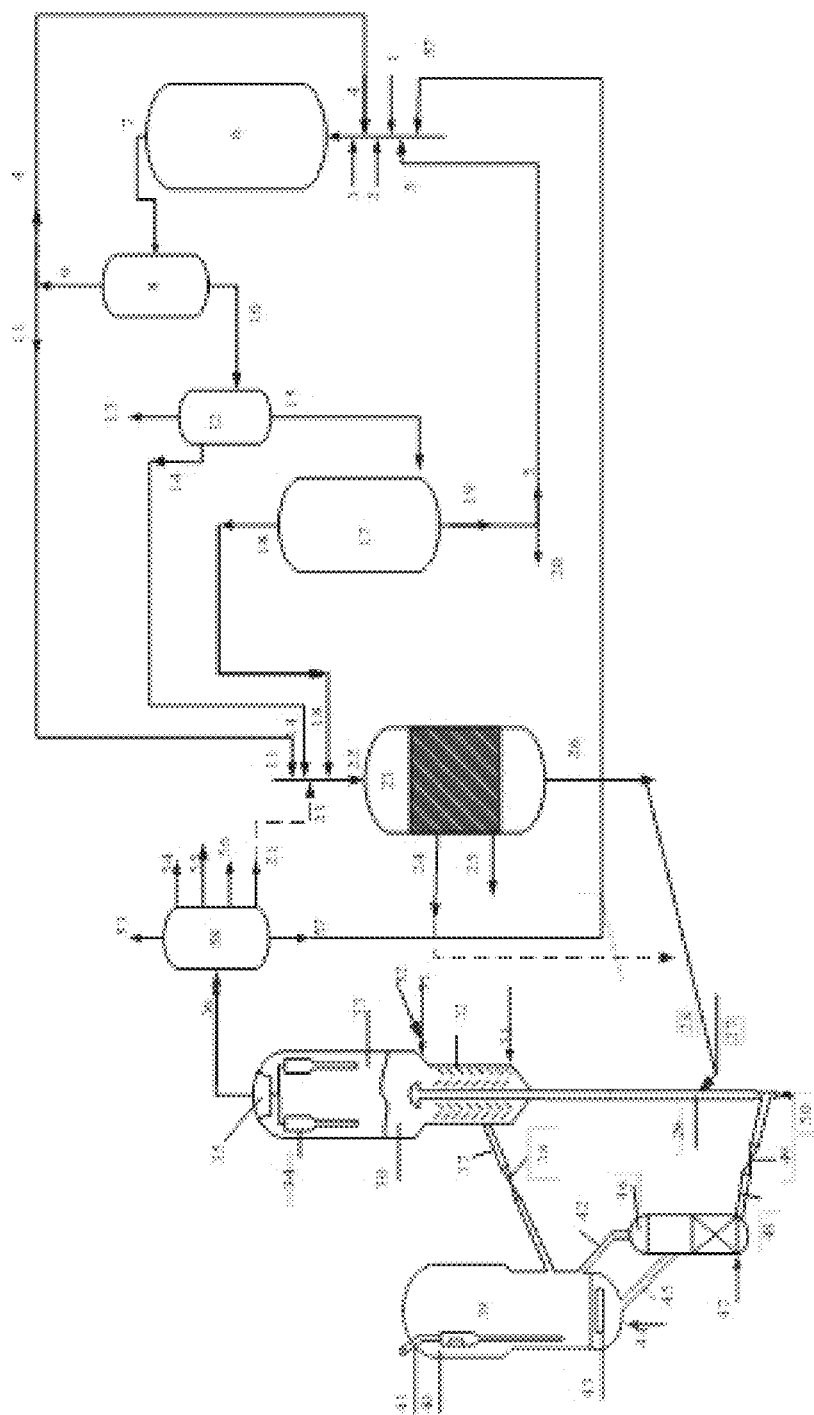
FIG. 2a shows a schematic diagram of another preferred embodiment of the process and system of the present application.
Figure 2B:
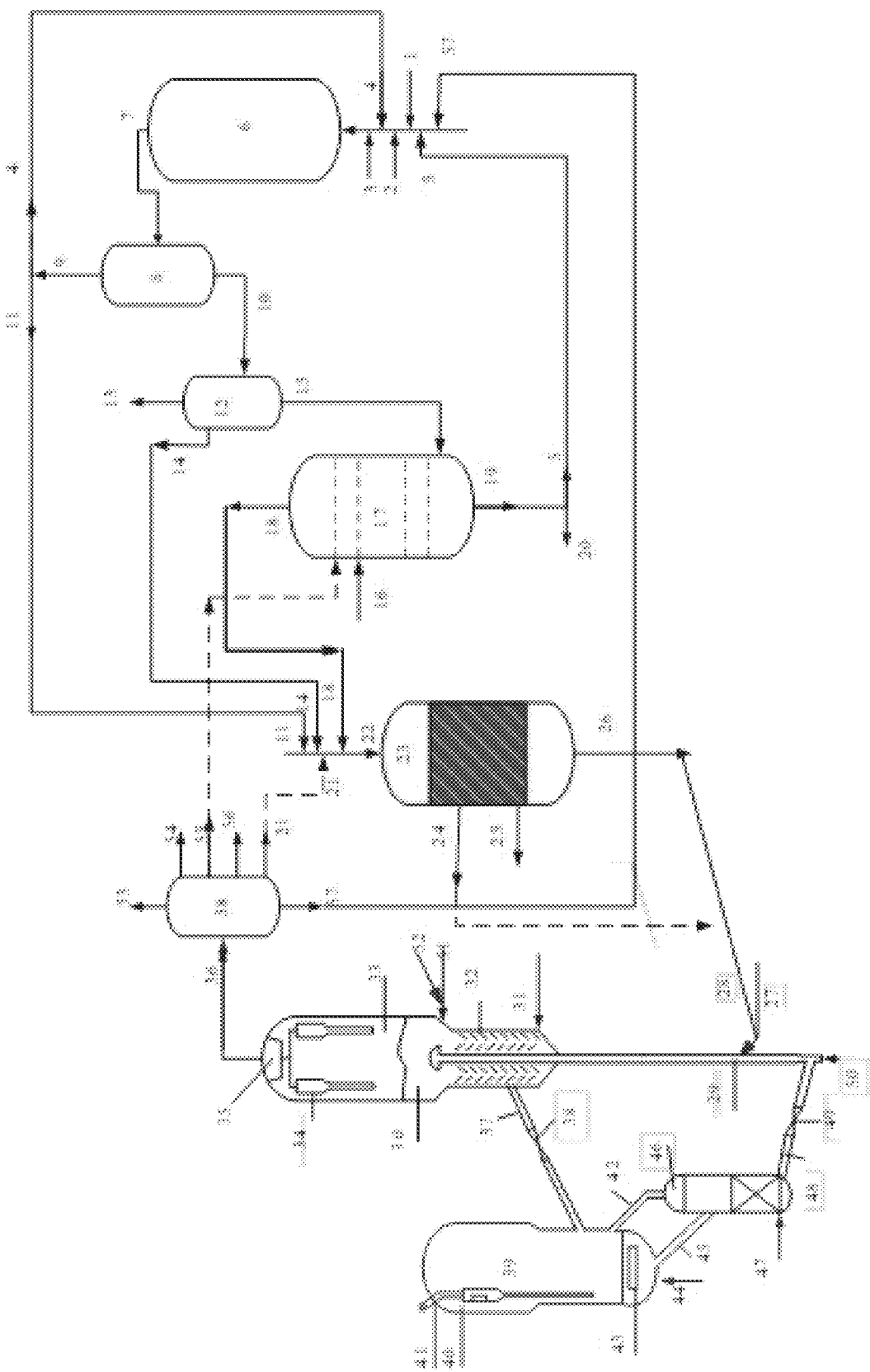
FIG. 2b shows a schematic diagram of another preferred embodiment of the process and system of the present application.

The hydro-upgraded heavy oils obtained in Example 5 and Example 6 were subjected to catalytic cracking (reactor type as shown in FIGS. 2a and 2b) on a medium-sized device using a catalytic cracking catalyst available from Qilu Catalyst Branch under the trade name MMC-2. Preheated hydro-upgraded oil was fed to a first reaction zone of a combined catalytic cracking reactor, and subjected to cracking reaction under conditions including an outlet temperature of the riser of 580° C., a reaction time of 1.8 seconds, a weight ratio of catalytic cracking catalyst to feedstock oil of 15, and a weight ratio of steam to feedstock oil of 0.25. The vapor and the catalyst flowed upward and entered a second reaction zone, and further reaction was carried out at a reaction temperature of 565° C. and a weight space velocity of catalyst bed of 4 h$^{-1}$. The reaction oil gas and the spent catalyst were passed to a shell type cyclone separator from the outlet of the reactor to allow a quick separation of the reaction oil gas and the spent catalyst, and the reaction oil gas was split in a separation system according to the distillation range, to obtain fractions such as ethylene, propylene, cracking gasoline and the like; the spent catalyst was passed to a steam stripping section under the action of gravity to strip off hydrocarbon products adsorbed on the spent catalyst by steam, and the stripped catalyst was passed to a regenerator to contact with air for regeneration; the regenerated catalyst was passed to a degassing tank to remove non-hydrocarbon gas impurities adsorbed on and carried by the regenerated catalyst; the degassed regenerated catalyst was recycled to the riser reactor for reuse. Operation conditions of the catalytic cracking unit and product distribution are listed in Table 5.

As can be seen from the results in Table 5, for the hydro-upgraded heavy oil, the yields of ethylene and propylene were 4.18 wt % and 20.50 wt %, respectively, and the yield of light olefins (ethylene yield+propylene yield+butene yield, the same applies hereinafter) was about 40.83%.

Comparative Examples 8 to 9

Substantially the same procedure as in examples 9-10 was carried out, except that the feedstock was the hydro-upgraded heavy oils obtained in Comparative Examples 4-5. Operation conditions of the catalytic cracking unit and product distribution are listed in Table 5.

As can be seen from the results in Table 5, for the hydro-upgraded heavy oil, the yields of ethylene and propylene were only 3.50 wt % and 19.87 wt %, respectively, and the yield of light olefins (ethylene yield+propylene yield+butene yield, the same applies hereinafter) was only 34.38%.

TABLE 5

Catalytic cracking reaction conditions and results of Examples 9 to 10 and Comparative Examples 8 to 9

| Item | Ex. 9 | Ex. 10 | Comp. Ex. 8 | Comp. Ex. 9 |
|---|---|---|---|---|
| Source of catalytic cracking feedstock oil (hydro-upgraded heavy oil) | Ex. 5 | Ex. 6 | Comp. Ex. 4 | Comp. Ex. 5 |
| First reaction zone | | | | |
| Reaction temperature/° C. | 580 | 580 | 580 | 580 |
| Reaction time/second | 1.8 | 1.8 | 1.8 | 1.8 |
| Weight ratio of catalyst to cracking feedstock | 15 | 15 | 15 | 15 |
| Weight ratio of steam to cracking feedstock | 0.25 | 0.25 | 0.25 | 0.25 |
| Second reaction zone | | | | |
| Reaction temperature/° C. | 565 | 565 | 565 | 565 |
| Weight space velocity/h$^{-1}$ | 4 | 4 | 4 | 4 |
| Catalytic cracking product distribution/wt % | | | | |
| H2-C2 (excluding ethylene) | 5.05 | 5.21 | 5.38 | 5.56 |
| Ethylene | 4.18 | 4.09 | 3.50 | 3.40 |
| C3-C4 (excluding propylene) | 20.9 | 20.38 | 19.87 | 19.37 |
| Propylene | 20.5 | 20.09 | 16.64 | 16.16 |
| C$_{5+}$ gasoline | 27.08 | 27.49 | 28.41 | 28.84 |
| Cycle oil | 13.52 | 13.81 | 16.11 | 16.42 |
| Slurry oil | 1.31 | 1.35 | 1.39 | 1.43 |
| Coke | 7.46 | 7.58 | 8.70 | 8.82 |
| Light olefins/% | 40.83 | 39.96 | 34.38 | 33.42 |

Example 11

The light cycle oil fraction having a boiling range of less than 350° C. in the cycle oil obtained in Example 10 was subjected to hydro-upgrading in the same manner as in Example 6, along with the upgraded oil obtained in Example 4. The hydro-upgrading conditions and product properties are shown in Table 6.

TABLE 6

Hydro-upgrading conditions and results for Example 11

| Item | Example 11 |
|---|---|
| Hydro-upgrading feedstock oil | Light cycle oil of Example 10 + upgraded oil of Example 4 |
| Feedstock ratio (light cycle oil/upgraded oil) | 0.42 |
| Hydro-upgrading conditions | |
| Hydrorefining/cracking reaction temperature/° C. | 382/383 |
| Hydrogen partial pressure/MPa | 15.0 |
| Trade name of hydrofining/cracking catalyst | RN-410/RHC-131 |
| Volume space velocity/h$^{-1}$ | 0.5 |
| Hydrogen-to-oil volume ratio | 1000 |
| Properties of hydro-upgraded heavy oil | |
| Density (20° C.)/(kg/m$^3$) | 895.0 |
| Sulfur/(μg/g) | <200 |
| Ni + V/(μg/g) | <1 |
| Hydrogen content/% | 12.86 |

Examples 12 to 13

The hydro-upgraded heavy oil obtained in Example 11 was subjected to catalytic cracking in a conventional riser reactor, the catalytic cracking catalyst was obtained from Qilu Branch of Sinopec Catalyst Co., Ltd. The catalytic cracking conditions and results are shown in Table 7.

As can be seen from the results in Table 7, when the light cycle oil and the upgraded oil are subjected to hydro-upgrading to obtain a hydro-upgraded heavy oil, and then the hydro-upgraded heavy oil is subjected to catalytic cracking to produce light olefins such as ethylene and propylene, the yield of light olefins of Example 12 can reach 36.22%, and the yield of light olefins of Example 13 can reach 36.92%.

TABLE 7

Catalytic cracking reaction conditions and results for Examples 12-13

| Item | Example 12 | Example 13 |
|---|---|---|
| Source of hydrocracking feedstock oil (hydro-upgraded heavy oil) | Example 11 | |
| Catalytic cracking conditions | | |
| Trade name of catalyst | MMC-2 | CEP-1 |
| Reaction temperature/° C. | 565 | 620 |
| Reaction time/second | 3 | 2.5 |
| Reaction pressure/MPa | 0.15 | 0.15 |
| Weight ratio of catalyst to cracking feedstock | 15.0 | 20 |
| Weight ratio of steam to cracking feedstock | 0.25 | 0.3 |
| Catalytic cracking product distribution/wt % | | |
| H$_2$-C$_2$ (excluding ethylene) | 5.21 | 12.14 |
| Ethylene | 4.09 | 12.59 |
| C$_3$-C$_4$ (excluding propylene) | 20.38 | 6.65 |
| Propylene | 20.09 | 19.67 |
| C$_{5+}$ gasoline | 27.49 | 19.42 |
| Cycle oil | 13.81 | 7.33 |
| Slurry oil | 1.35 | 10.26 |
| Coke | 7.58 | 11.94 |
| Yield of light olefins/% | 36.22 | 36.92 |

Example 14

An experiment was carried out like in Example 2 on a pilot plant, in which the slurry oil obtained in Example 10 was recycled, and mixed with the inferior oil B and the recycled pitch for conversion reaction, and then the conversion product was subjected to a first separation to obtain a first separated product and a second separated product. The first separated product was subjected to a second separation (extractive separation) to obtain an upgraded oil and a pitch. A part of the pitch was recycled, and the rest was discarded.

Operating conditions of each step were the same as in Example 2, and the results are shown in Table 8.

The results in Table 8 show that the conversion rate of the inferior oil and the yield of LPG+liquid product are increased by 1.6% and 1.3%, respectively, through the recycle of the slurry oil, and the yield of toluene insolubles is reduced by 50%.

TABLE 8

Comparison of results of Examples 2 and 14

| Item | Example 2 | Example 14 |
|---|---|---|
| Inferior oil feedstock (values shown in parentheses are weight percentages) | Inferior oil B | Inferior oil B (90) + slurry oil (10) |
| Source of slurry oil | | Example 10 |
| Recycle of pitch | Yes | Yes |
| Conversion rate of conversion reaction/wt % | 56.8 | 53.7 |
| Product distribution/wt % | | |
| First separated product | 69.4 | 76.6 |
| Content of the special component in the first separated product/wt % | 38 | 42 |
| Content of components having a boiling point less than 350° C. in the first separated product/wt % | 2 | 1 |
| Second separated product | 25.8 | 18.6 |
| End boiling point of second separated product/° C. | 348 | 350 |
| Upgrading results | | |
| Conversion rate of inferior oil/wt % | 94.8 | 96.4 |
| Discard rate of pitch/wt % | 5.2 | 3.6 |
| Yield of LPG + liquid product/wt % | 89.5 | 90.8 |
| Heavy metal content of upgraded oil/weight (μg/g) | <1 | <1 |
| Asphaltene content of upgraded oil/wt % | <0.1 | <0.1 |
| Yield of toluene insolubles/wt % | 0.4 | 0.2 |

The results of the examples show that the process and system of the present application can greatly improve the yield of LPG+liquid product obtained by upgrading of inferior oils, improve the quality of feedstock for catalytic cracking unit, and have the advantages of high yields of ethylene and propylene and high yield of high-octane gasoline.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A process for producing light olefins from inferior oils, comprising:
   1) Subjecting an inferior oil feedstock to a thermal conversion reaction in the presence of hydrogen to obtain a conversion product;
   2) Subjecting the conversion product to a first separation to obtain a first separated product, wherein the first separated product has a content of components having a boiling point below 350° C. of not greater than about 5 wt %, and a content of components having a boiling point between 350° C. and 524° C. of about 20-60 wt %;
   3) Subjecting the first separated product to a second separation to obtain an upgraded oil and a pitch, wherein the second separation is selected from the group consisting of vacuum distillation, solvent extraction, or a combination thereof;
   4) Subjecting the upgraded oil obtained in step 3) to hydro-upgrading to obtain a hydro-upgraded oil;
   5) Subjecting the hydro-upgraded oil obtained in step 4) to a third separation to obtain a hydro-upgraded heavy oil;
   6) Subjecting the hydro-upgraded heavy oil obtained in step 5) to catalytic cracking to obtain a catalytic cracking product comprising a light olefin; and
   7) sending at least a part of the pitch obtained in step 3) to step 1) for the thermal conversion reaction.

2. The process according to claim 1, wherein the thermal conversion reaction of step 1) is conducted in a slurry bed reactor.

3. The process according to claim 1, wherein the thermal conversion reaction of step 1) is carried out in the presence of hydrogen and a conversion catalyst, wherein the conversion catalyst comprises at least one compound selected from the group consisting of Group VB metal compounds, Group VIB metal compounds and Group VIII metal compounds.

4. The process according to claim 3, wherein the thermal conversion reaction of step 1) is carried out under conditions including: a temperature of about 380-470° C., a hydrogen partial pressure of about 10-25 MPa, a volume space velocity of the inferior oil of about 0.01-2 $h^{-1}$, a volume ratio of hydrogen to the inferior oil of about 500-5000, and an amount of the conversion catalyst of about 10-50000 μg/g calculated on the basis of the active metal in the conversion catalyst and relative to the weight of the inferior oil.

5. The process according to claim 1, wherein the inferior oil is at least one selected from the group consisting of inferior crude oil, heavy oil, deoiled asphalt, coal derived oil, shale oil, and petrochemical waste oil.

6. The process according to claim 1, wherein the thermal conversion reaction of step 1) is carried out to an extent that a conversion rate of about 30-70 wt % is obtained, wherein the conversion rate=(weight of components having a boiling point above 524° C. in the inferior oil−weight of components having a boiling point above 524° C. in the conversion product)/weight of components having a boiling point above 524° C. in the inferior oil×100 wt %.

7. The process according to claim 1, wherein the first separating of step 2) comprises:
   2a) separating the conversion product obtained in step 1) at a first pressure and a first temperature to obtain a gas component and a liquid component; and
   2b) separating the resulting liquid component at a second pressure and a second temperature to yield the first separated product and a second separated product, wherein the first pressure is greater than the second pressure.

8. The process according to claim 7, wherein the first separating of step 2) further comprises:
   2c) splitting at least a part of the second separated product obtained in step 2b) to obtain a naphtha and an atmospheric gas oil;

2d) sending at least a part of the gas component obtained in step 2a) to step 1) for the thermal conversion reaction; and/or 2e) sending at least a part of the gas component obtained in step 2a) to step 4) for the hydro-upgrading.

9. The process according to claim 8, further comprising:

2f) sending at least a part of the second separated product obtained in step 2b) and/or at least a part of the atmospheric gas oil obtained in step 2c) to step 4) for hydro-upgrading together with the upgraded oil.

10. The process according to claim 1, wherein the hydro-upgrading of step 4) is carried out under conditions including: a hydrogen partial pressure of about 5.0-20.0 MPa, a reaction temperature of about 330-450° C., a volume space velocity of about 0.1-3 $h^{-1}$, and a hydrogen-to-oil volume ratio of about 300-3000.

11. The process according to claim 1, wherein the hydro-upgrading of step 4) is carried out in the presence of a hydrorefining catalyst and/or a hydrocracking catalyst, the hydrorefining catalyst comprises a carrier and an active metal component selected from Group VIB metals and/or Group VIII non-noble metals; the hydrocracking catalyst comprises a zeolite, alumina, at least one Group VIII metal component and at least one Group VIB metal component.

12. The process according to claim 1, wherein the catalytic cracking of step 6) is carried out in a varied-diameter dilute-phase transport bed reactor and/or a combined catalytic cracking reactor, wherein the varied-diameter dilute-phase transport bed reactor comprises, from bottom to top, a first reaction zone and a second reaction zone having different diameters, the ratio of the diameter of the second reaction zone to the diameter of the first reaction zone is from about 1.2:1 to about 2.0:1; the combined catalytic cracking reactor comprises, from bottom to top, a first reaction zone and a second reaction zone, wherein the first reaction zone is a riser reactor, and the second reaction zone is a fluidized bed reactor.

13. The process according to claim 12, wherein:

in the varied-diameter dilute-phase transport bed reactor, the reaction conditions in the first reaction zone include: a reaction temperature of about 500-620° C., a reaction pressure of about 0.2-1.2 MPa, a reaction time of about 0.1-5.0 seconds, a weight ratio of catalyst to cracking feedstock of about 5-15, and a weight ratio of steam to cracking feedstock of about 0.05:1 to about 0.3:1; and the reaction conditions in the second reaction zone include: a reaction temperature of about 450-550° C., a reaction pressure of about 0.2-1.2 MPa, a reaction time of about 1.0-20.0 seconds, and/or in the combined catalytic cracking reactor, the reaction conditions in the first reaction zone include: a reaction temperature of about 560-750° C., a reaction time of about 1-10 seconds, and a catalyst-oil ratio of about 1:1 to about 50:1; and the reaction conditions in the second reaction zone include: a reaction temperature of about 550-700° C., and a weight space velocity of about 0.5-20 $h^{-1}$.

14. The process according to claim 1, wherein the catalytic cracking of step 6) is conducted in the presence of a catalytic cracking catalyst comprising, based on the weight of the catalyst, about 1-60 wt % of a zeolite, about 5-99 wt % of an inorganic oxide, and about 0-70 wt % of clay, and wherein the zeolite comprises about 50-100 wt % of a mesoporous zeolite, and about 0-50 wt %, of a macroporous zeolite, based on the total weight of the zeolite.

15. The process according to claim 1, wherein:

the second separation of step 3) is a vacuum distillation, a solvent extraction, or a combination of vacuum distillation and extractive separation, wherein the vacuum distillation is carried out at a vacuum degree of about 1-20 mmHg and a temperature of about 250-350° C.;

the solvent extraction is carried out under conditions including: a pressure of about 3-12 MPa; a temperature of about 55-300° C.; an extraction solvent of $C_3$-$C_7$ hydrocarbon, and further at least one of $C_3$-$C_4$ alkanes and $C_3$-$C_4$ alkenes; a weight ratio of extraction solvent to the first separated product of about 1:1 to about 7:1.

16. The process according to claim 1, wherein in step 7) about 30-95 wt % of the pitch obtained in step 3) is sent to step 1) for the thermal conversion reaction.

17. The process according to claim 1, wherein the third separation of step 5) comprises splitting the hydro-upgraded oil into a hydro-upgraded light oil and a hydro-upgraded heavy oil, and the split point between the hydro-upgraded light oil and the hydro-upgraded heavy oil is about 340-360° C.

18. A system for producing light olefins from inferior oils, comprising a thermal conversion reaction unit, a first separation unit, a second separation unit, a hydro-upgrading unit, a third separation unit and a catalytic cracking unit, wherein:

the thermal conversion reaction unit is configured to carry out a thermal conversion reaction on an inferior oil feedstock in the presence of hydrogen to obtain a conversion product;

the first separation unit is configured to separate the conversion product to obtain a first separated product, in which the content of components having a boiling point below 350° C. is not greater than about 5 wt %, and the content of components having a boiling point between 350° C. and 524° C. is about 20-60 wt %;

the second separation unit is configured to separate the first separated product into an upgraded oil and a pitch, and is selected from the group consisting of vacuum distillation unit, solvent extraction unit or a combination thereof;

the hydro-upgrading unit is configured to carry out hydro-upgrading reaction on the upgraded oil to obtain a hydro-upgraded oil;

the third separation unit is configured to separate the hydro-upgraded oil to obtain a hydro-upgraded heavy oil; and the catalytic cracking unit is configured to carry out catalytic cracking reaction on the hydro-upgraded heavy oil to obtain a catalytic cracking product comprising a light olefin.

19. The system according to claim 18, wherein the thermal conversion reaction unit comprises a slurry bed reactor.

20. The system according to claim 18, wherein the catalytic cracking unit comprises a varied-diameter dilute-phase transport bed reactor and/or a combined catalytic cracking reactor consisting of a riser reactor and a fluidized bed reactor.

* * * * *